US012208363B2

(12) United States Patent
Rotsch et al.

(10) Patent No.: US 12,208,363 B2
(45) Date of Patent: Jan. 28, 2025

(54) REMOTE SUBLIMINATION APPARATUS

(71) Applicant: UCHICAGO ARGONNE, LLC, Chicago, IL (US)

(72) Inventors: David Rotsch, Montgomery, IL (US); Jerry A. Nolen, Jr., Chicago, IL (US); Sergey D. Chemerisov, Lisle, IL (US); James L Bailey, Hinsdale, IL (US); Ronald T. Kmak, Homer Glen, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 740 days.

(21) Appl. No.: 17/460,150

(22) Filed: Aug. 27, 2021

(65) Prior Publication Data

US 2023/0068910 A1 Mar. 2, 2023

(51) Int. Cl.
*B01D 7/00* (2006.01)
*F27B 14/10* (2006.01)

(52) U.S. Cl.
CPC ............... *B01D 7/00* (2013.01); *F27B 14/10* (2013.01)

(58) Field of Classification Search
CPC ..... B01D 7/00; B01J 6/00; B01J 6/007; F27B 14/10; F27B 14/14; F27B 14/20; F27B 2014/0831
USPC .................................................. 422/243, 244
See application file for complete search history.

(56) References Cited

U.S. PATENT DOCUMENTS

| | | | |
|---|---|---|---|
| 5,784,423 A | 7/1998 | Lidsky et al. | |
| 5,802,438 A | 9/1998 | Bennett et al. | |
| 6,907,106 B1 | 6/2005 | McIntyre et al. | |
| 10,006,101 B2 | 6/2018 | Stoner et al. | |
| 2009/0090875 A1 | 4/2009 | Gelbart et al. | |
| 2010/0028234 A1 | 2/2010 | Ehst et al. | |
| 2014/0348284 A1 | 11/2014 | Diamond et al. | |
| 2016/0040267 A1 | 2/2016 | Stoner et al. | |
| 2019/0259505 A1 | 8/2019 | Murakami et al. | |
| 2020/0029420 A1 | 1/2020 | Ylimaki | |
| 2020/0043621 A1 | 2/2020 | Comor et al. | |

(Continued)

OTHER PUBLICATIONS

International Application No. PCT/US2022/040705, Invitation to Pay Additional Fees and, Where Applicable, Protest Fee, mailed Nov. 29, 2022.

(Continued)

*Primary Examiner* — Lessanework Seifu
(74) *Attorney, Agent, or Firm* — MARSHALL, GERSTEIN & BORUN LLP

(57) ABSTRACT

A remotely controllable sublimation apparatus that includes a crucible block adapted to retain a crucible containing a solid mixture comprising one or more radionuclides, a first heating block comprising one or more first heating elements configured to selectively generate heat having a first temperature sufficient to at least partially sublime the solid mixture, and a collection vessel coupled to the first heating block. The crucible block is movable, relative to the first heating block, between an open position and a closed positon. When the crucible block is in the closed position, the one or more first heating elements are configured to heat the crucible block to the first temperature, thereby heating the solid mixture and producing a vapor that is collected by the collection vessel and leaving a solid residue in the crucible that substantially consists only of the one or more radionuclides.

22 Claims, 11 Drawing Sheets

(56) References Cited

U.S. PATENT DOCUMENTS

2020/0066418 A1    2/2020   Rotsch et al.
2020/0270722 A1    8/2020   Stoner et al.

OTHER PUBLICATIONS

Search Report and Written Opinion issued in International Patent Application No. PCT/US2022/040705, dated Jan. 23, 2023.

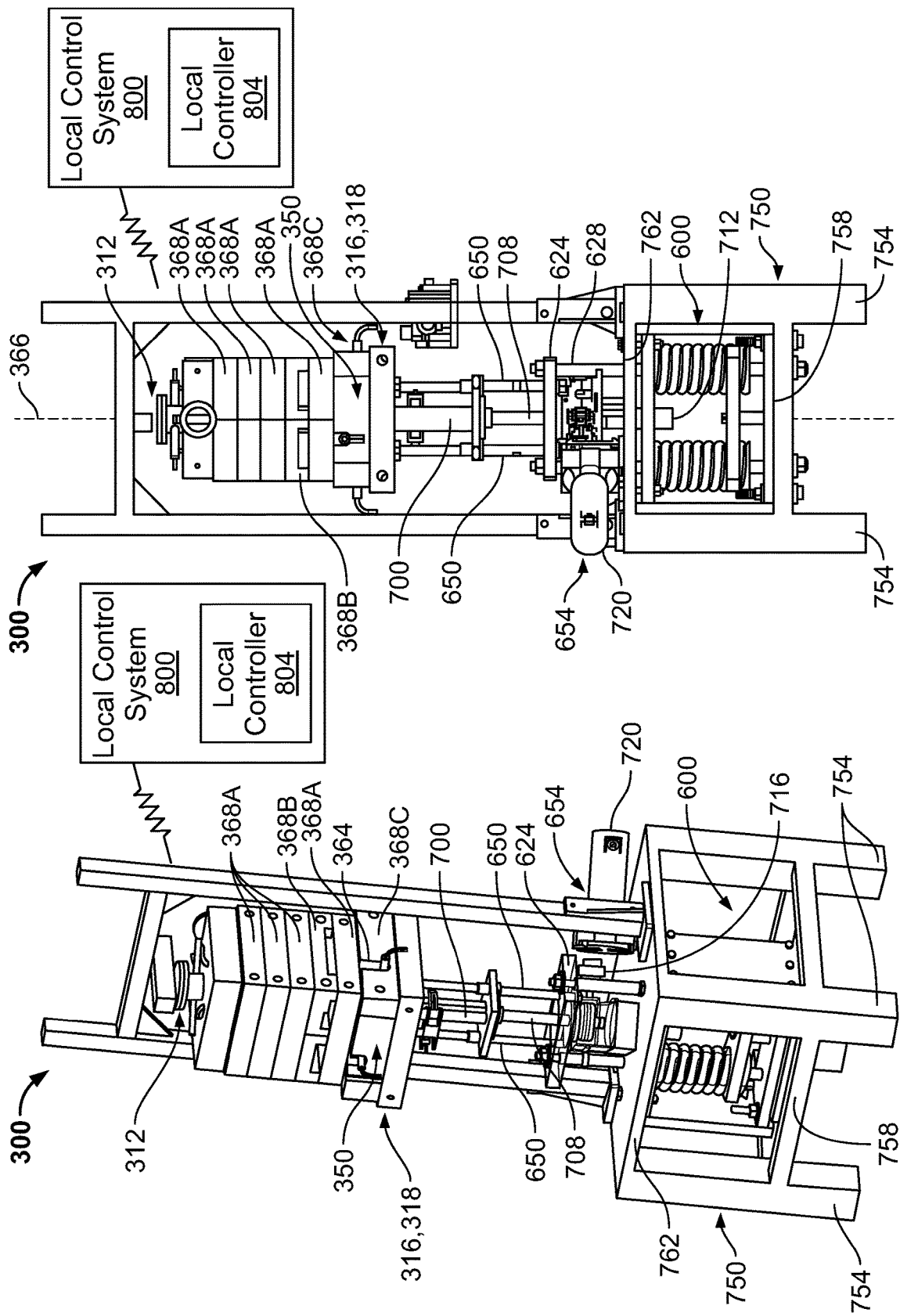

REMOTE SUBLIMATION APPARATUS

STATEMENT REGARDING FEDERALLY SPONSORED RESEARCH OR DEVELOPMENT

The United States ("U.S.") Government has rights in this invention pursuant to Contract No. DE-AC02-06CH11357 between the U.S. Department of Energy and UChicago Argonne, LLC, representing Argonne National Laboratory.

TECHNICAL FIELD OF THE INVENTION

The present disclosure generally relates to sublimation and, more particularly, to a sublimation apparatus that can be controlled remotely.

BACKGROUND OF THE INVENTION

Nuclear medicine is a specialized area of medicine that involves the use of small amounts of radioactive particles, known as radiopharmaceuticals, to diagnose and treat a variety of conditions, including various types of cancers, heart conditions (e.g., heart diseases), and other disorders. These radiopharmaceuticals rely on radionuclides as active pharmaceutical ingredients. One such radionuclide, copper-67, when combined with a pharmaceutical agent, is effective at, for example, targeting and irradiating small tumors associated with Non-Hodgkin's lymphoma and other types of cancer without damaging surrounding healthy tissue.

Radionuclides, the active ingredient in radiopharmaceuticals can be purified and isolated using many known methods. One such method, known as sublimation, involves using a sublimation apparatus to selectively heat a solid mixture containing the desired radionuclide(s) in a way that produces a metal vapor that is separated from a solid residue substantially consisting of only the desired radionuclide(s). More particularly, the solid mixture is positioned within a sublimation vessel, and selectively heated therein, thereby producing the metal vapor, which condenses within and is collected by a collection vessel that is coupled to the sublimation vessel and subject to vacuum pressure. The condensation and collection of the metal vapor leaves the solid residue substantially consisting of only the radionuclide(s) in the sublimation vessel. The solid residue can in turn be removed and subjected to further chemical processing (e.g., dissolved in an aqueous acid, separated from other trace metals using an anion exchange) in order to fully purify and isolate the desired radionuclide(s). Meanwhile, the metal vapor that has solidified on a solid surface of the collection vessel (usually colder in temperature from where it was sublimed from) can be melted and recycled or re-used as desired.

FIGS. 1 and 2 illustrate one example of a known sublimation apparatus 100 including a sublimation vessel (that contains the solid to be sublimed) 104 and a collection vessel 108 (where the sublimated material is condensed and solidified). The sublimation vessel 104 takes the form of a plate 112 and a crucible 116 that is disposed on the plate 112 and contains a solid mixture including one or more desired radionuclides. In this example, the solid mixture is an isotope-enriched metal target comprising zinc-68 (the target material) and copper-67, with copper-67 being the desired radionuclide. The collection vessel 108 is installed over the sublimation vessel 104 and includes a cylinder 120 and a plate 124 coupled to the cylinder 120. In order to secure the collection vessel 108 to the sublimation vessel 104 (and vice-versa), the collection vessel 108 is positioned such that the cylinder 120 surrounds the crucible 116 and the plate 124 engages the plate 112 (and vice-versa) so that a gasket located between the plates creates a hermetic seal, at which time a plurality of bolts 128 are inserted into apertures formed in each of the plate 112 and the plate 124, and a plurality of nuts 132 are used to secure the plurality of bolts 128 in place and create the force required to compress the gasket.

Once the collection vessel 108 is installed over the sublimation vessel 104, a vacuum is applied to an interior volume of the collection vessel 108, and the crucible 116 is heated to a specific temperature (in this case, approximately 650 degrees Celsius) by a heating element (not shown) surrounding the lower portion of the sublimation apparatus 100 (where the crucible 116 is located). In turn, the zinc-68, which has a greater vapor pressure than that of the copper-67 at this specific temperature, is selectively and substantially converted into the vapor phase. The zinc-68 is subsequently collected by and condenses within the collection vessel 108, thereby leaving a solid residue in the crucible 116 that substantially consists of only the copper-67. The crucible 116 can therefore be removed, and the solid residue subjected to further processing in order to fully purify and isolate the copper-67, while the zinc-68 can be melted and recycled, as discussed above.

While the sublimation apparatus 100 is effective at, for example, isolating Cu-67 from an isotope-enriched metal target comprising zinc-68 and copper-67, it can be difficult to manipulate the components of the sublimation apparatus 100, particularly the plurality of bolts 128 and the plurality of nuts 132, in order to ensure that the sublimation apparatus 100 has a vacuum tight seal. For example, 90 in-lbs of torque is required to properly install each of the plurality of bolts 128. The difficulty is enhanced when working with large quantities of radioactive material by the fact that the manipulation must be done within a shielded environment (e.g., a hot cell), such that the manipulation is typically performed with remote mechanical hands called manipulators, which are effectively hand-sized pincers that have relatively little dexterity.

SUMMARY OF THE INVENTION

In accordance with a first aspect, a sublimation apparatus adapted to be disposed in a shielded environment is provided. The sublimation apparatus is configured to be controlled remotely from outside the shielded environment, the sublimation apparatus including: a crucible block adapted to retain a crucible containing a solid mixture including one or more radionuclides; a first heating block including one or more first heating elements configured to selectively generate heat having a first temperature sufficient to at least partially sublime the solid mixture; and a collection vessel coupled to the first heating block, wherein the crucible block is movable, relative to the first heating block, between an open position, in which the crucible block is spaced from the first heating block and the collection vessel, and a closed positon, in which the crucible block is at least partially disposed within the first heating block and the collection vessel is in fluid communication with the crucible, and wherein when the crucible block is in the closed position, the one or more first heating elements are configured to heat the crucible block to the first temperature, thereby heating the solid mixture and producing a vapor that is collected by the collection vessel and leaving a solid residue in the crucible that substantially consists only of the one or more radionuclides.

In accordance with a second aspect, a sublimation apparatus adapted to be disposed in a shielded environment is provided. The sublimation apparatus is configured to be controlled remotely from outside the shielded environment, the sublimation apparatus including: a crucible block adapted to retain a crucible containing a solid mixture including one or more radionuclides; a lower heating block, the lower heating block including one or more lower heating elements configured to selectively generate heat having a first temperature sufficient to at least partially sublime the solid mixture; an upper heating block thermally insulated from the lower heating block; and a collection vessel coupled to the upper heating block, wherein the crucible block is movable, relative to the lower heating block, between an open position, in which the crucible block is spaced from the lower heating block and the collection vessel, and a closed positon, in which the crucible block is at least partially disposed within the lower heating block and the collection vessel is in fluid communication with the crucible, wherein when the crucible block is in the closed position, the one or more lower heating elements are configured to heat the crucible block to the first temperature, thereby heating the solid mixture and producing a metal vapor that is collected by the collection vessel and leaving a solid residue in the crucible that substantially consists only of the one or more radionuclides, and wherein the upper heating block includes one or more upper heating elements configured to selectively generate heat having a second temperature sufficient to melt the vapor in the collection vessel.

In accordance with a third aspect, a sublimation apparatus adapted to be disposed in a shielded environment is provided. The sublimation apparatus is configured to be controlled remotely from outside the shielded environment, the sublimation apparatus including: a crucible block adapted to retain a crucible containing a solid mixture including one or more radionuclides; a lower heating block including one or more lower heating elements configured to selectively generate heat having a first temperature sufficient to at least partially sublime the solid mixture; an upper heating block thermally insulated from the lower heating block; a collection vessel coupled to the upper heating block, the upper heating block including one or more upper heating elements configured to selectively generate heat to heat the collection vessel; and one or more cooling passages formed through the upper heating block, the one or more cooling passages configured to selectively direct cooling fluid or gas toward the collection vessel to facilitate condensation of the metal vapor, wherein the crucible block is movable, relative to the lower heating block, between an open position, in which the crucible block is spaced from the lower heating block and the collection vessel, and a closed positon, in which the crucible block is at least partially disposed within the lower heating block and the collection vessel is in fluid communication with the crucible, and wherein when the crucible block is in the closed position, the one or more lower heating elements are configured to heat the crucible block to the first temperature, thereby heating the solid mixture and producing a vapor that is collected by the collection vessel and leaving a solid residue in the crucible that substantially consists only of the one or more radionuclides.

In accordance with a fourth aspect, a sublimation apparatus adapted to be disposed in a shielded environment is provided. The sublimation apparatus is configured to be controlled remotely from outside the shielded environment, the sublimation apparatus including: a crucible block adapted to retain a crucible; a collection vessel including vapor condensate; and a heating block coupled to the collection vessel and including one or more heating elements configured to selectively generate heat having a temperature sufficient to melt the vapor condensate in the collection vessel, wherein the crucible block is movable, relative to the heating block, between an open position, in which the crucible block is spaced from the heating block and the collection vessel, and a closed positon, in which the collection vessel is in fluid communication with the crucible, wherein when the crucible block is in the closed position, the one or more heating elements are configured to heat the heating block surrounding the collection vessel and the crucible block to the first temperature, thereby melting substantially all of the metal vapor condensate in the collection vessel, and wherein the crucible collects the melted vapor condensate.

In further accordance with any one or more of the foregoing first, second, third, or fourth aspects, a sublimation apparatus may further include any one or more of the following preferred forms.

In some forms, the sublimation apparatus further includes a second heating block thermally insulated from the first heating block, the first heating block including the one or more first heating elements configured to selectively generate the heat having the first temperature, and the second heating block including one or more second heating elements configured to selectively generate heat having a second temperature sufficient to melt the vapor collected by the collection vessel.

In some forms, when the crucible block is in the closed position, the crucible block is at least partially disposed within the first heating block and the one or more first heating elements are configured to generate the heat having the first temperature to heat the crucible block to the first temperature.

In some forms, wherein the second heating block surrounds an upper portion of the collection vessel.

In some forms, the sublimation apparatus further including one or more cooling passages formed immediately adjacent the second heating block, the one or more cooling passages configured to selectively direct cooling fluid toward the collection vessel to facilitate condensation of the metal vapor.

In some forms, wherein the crucible block further includes a sealing element configured to seal the crucible from the ambient environment when the crucible block is in the closed position.

In some forms, the sublimation apparatus further includes a compensator assembly operatively coupled to the crucible block, the compensator assembly including one or more springs configured to apply a constant load on the sealing element.

In some forms, the sublimation apparatus further includes a drive assembly operably coupled to the crucible block to move the crucible block between the open position and the closed position.

In some forms, the drive assembly includes a screw jack; a screw jack shaft operatively coupled to the screw jack and to the crucible block; and a drive motor configured to drive the screw jack to move the screw jack shaft, thereby moving the crucible block between the open position and the closed position.

In some forms, the sublimation apparatus further includes a slip clutch installed between the drive motor and the screw jack.

In some forms, the sublimation apparatus further includes one or more cooling passages formed through the upper heating block, the one or more cooling passages configured to selectively direct cooling fluid toward the collection vessel to facilitate condensation of the metal vapor.

In some forms, the sublimation apparatus further includes an air blower fluidly coupled to the one or more cooling passages and configured to direct the cooling fluid into the one or more cooling passages.

In some forms, the sublimation apparatus further includes one or more discharge passages formed between the upper heating block and the lower heating block, the one or more discharge passages fluidly coupled to the one or more cooling passages to exhaust the cooling fluid.

In some forms, wherein the crucible block further includes a compensator assembly operatively coupled to the crucible block, the compensator assembly including one or more springs configured to apply a constant load on the sealing element.

In some forms, the second temperature is substantially equal to the first temperature.

In some forms, the second temperature is different from the first temperature.

BRIEF DESCRIPTION OF THE DRAWINGS

Examples of the invention will now be described with reference to the accompanying drawings, in which:

FIG. 4 is similar to FIG. 3, but with the shielded environment removed for clarity;

FIG. 5 is a front view of FIG. 3;

DETAILED DESCRIPTION

The present disclosure is generally directed to a sublimation apparatus that aims to address the problems with the known sublimation apparatus 100 described above and other sublimation apparatuses and sublimation methods for producing and isolating one or more radionuclides. More particularly, the disclosed sublimation apparatus is configured to purify and isolate one or more radionuclides while being controlled remotely from outside a shielded environment in which the sublimation apparatus is disposed. In other words, the components of the disclosed sublimation apparatus need not be manipulated (e.g., to create a vacuum tight seal), either via manipulators or manually by an operator within the shielded environment, to perform the sublimation. Instead, the components of the disclosed sublimation apparatus can be fully controlled remotely by a remotely located controller or by the operator while the operator is disposed outside the shielded environment. Thus, the disclosed sublimation apparatus is both easier and safer to use than known sublimation apparatuses. At the same time, the disclosed sublimation apparatus is just as effective (if not more) as known sublimation apparatuses, and beneficially, allows the thermal conditions in the sublimation apparatus to be quickly and easily adjusted in order to optimize the sublimation process.

Figure 2:
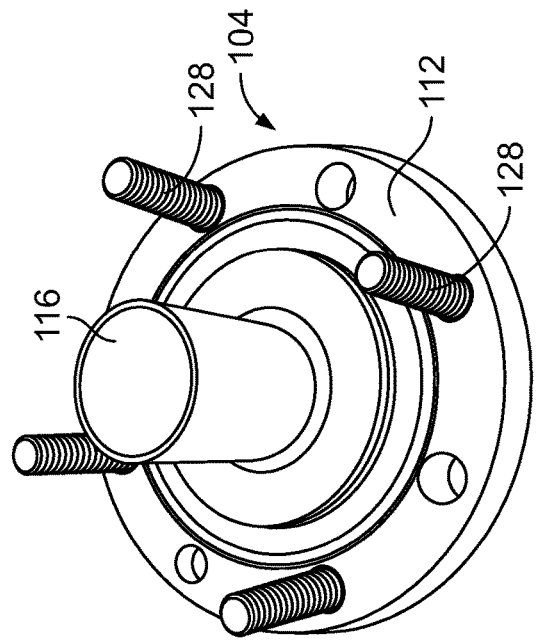
FIG. 2 illustrates a sublimation vessel of the known sublimation apparatus of FIG. 1.
Figure 1:
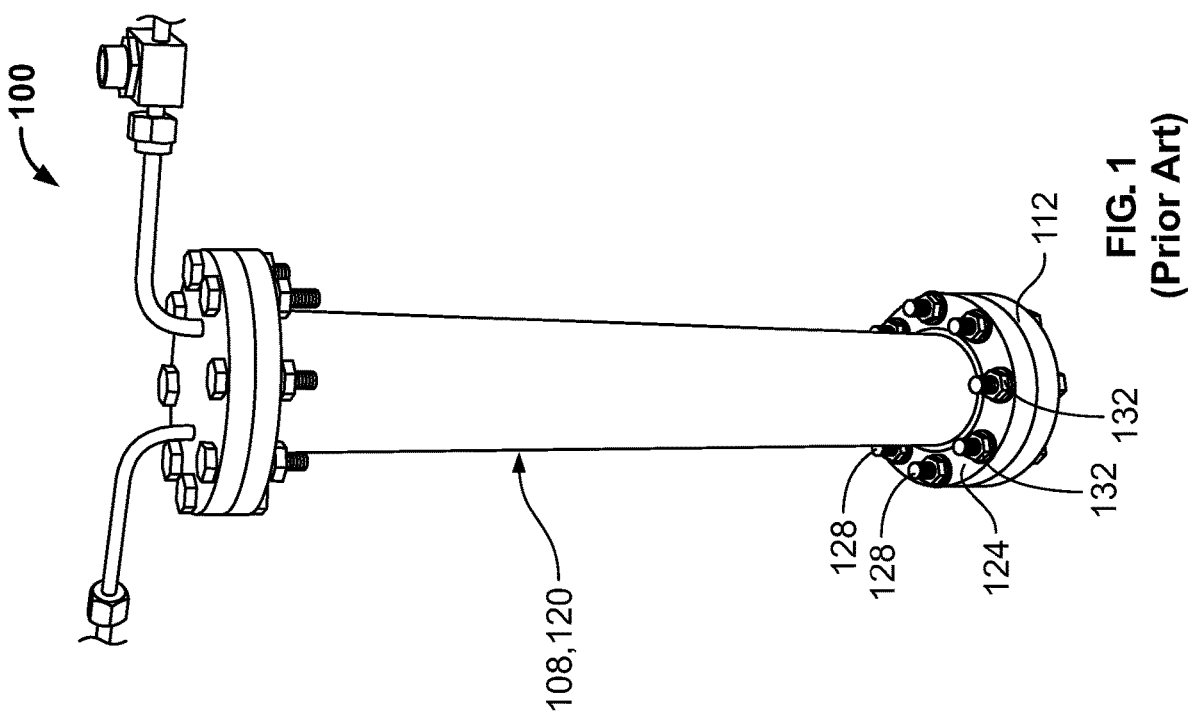
FIG. 1 illustrates an example known sublimation apparatus.
Figure 3:
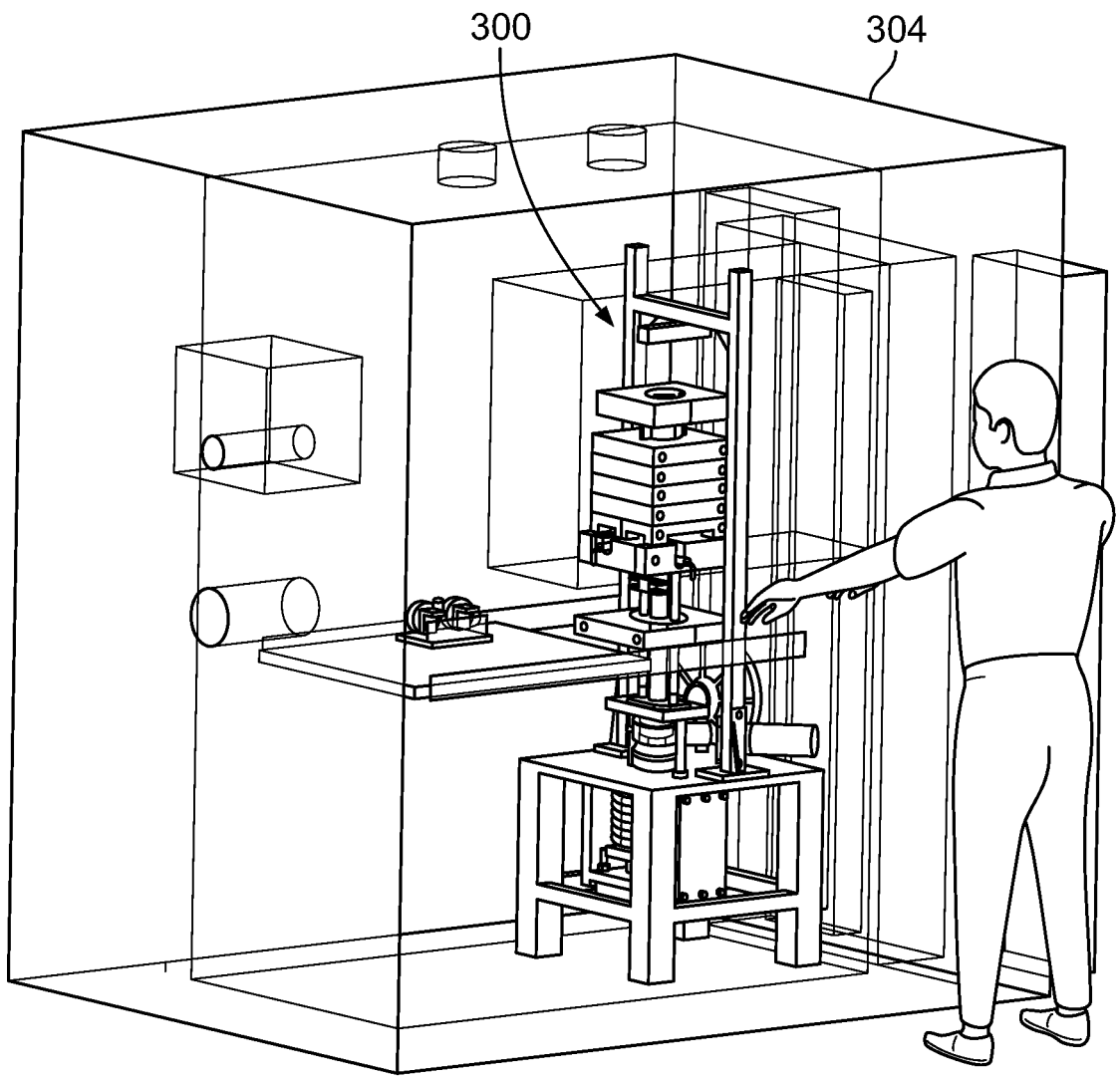
FIG. 3 is a perspective view of an example of a sublimation apparatus constructed in accordance with the teachings of the present disclosure and disposed in a shielded environment.

FIGS. 3-13 illustrate one example of a sublimation apparatus 300 constructed in accordance with the teachings of the present disclosure and disposed in a shielded environment 304 (only depicted in FIG. 3). In this example, the shielded environment 304 is a hot cell, i.e., a concrete bunker with thick walls that protects the surrounding environment from radioactive material used therein, though in other examples the shielded environment can take a different form. The sublimation apparatus 300 generally includes a crucible block 316 configured to receive and retain a crucible 307 containing a solid mixture including one or more radionuclides, a first (or lower) heating block 350 including one or more first heating elements 358 configured to generate heat to selectively heat the crucible 307 as desired, a collection vessel 312 selectively coupled to the crucible block 316, and a second (or upper) heating block 354 including one or more second heating elements 362 configured to generate heat to selectively heat the collection vessel 312 as desired.

In this example, the solid mixture preferably takes the form of an isotope-enriched metal target comprising zinc-68 and copper-67 (the desired radionuclide), though other solid mixtures can be used as well. Thus, at least in this example, the sublimation apparatus 300 is configured to purify and substantially isolate copper-67 from the isotope-enriched metal target comprising zinc-68 and copper-67, all while being controlled remotely from outside the shielded environment 304. To this end, the crucible block 316 is movable, relative to the lower heating block 350, between an open position, specifically shown in FIGS. 8 and 9, in which the crucible block 316 is spaced from the lower heating block 350 and the collection vessel 312, and a closed position, specifically shown in FIGS. 10 and 11, in which the crucible block 316 is at least partially disposed within the lower heating block 350 and the collection vessel 312 is in fluid communication with the crucible 307. When it is desired to substantially sublime the solid mixture, the crucible block 316 is positioned in the closed position, and the one or more first heating elements 358 are configured to heat the crucible 307 carried by the crucible block 316 to a first pre-determined temperature that heats the solid mixture so as to produce a vapor (in this case, a metal vapor of zinc-68, which solidifies in the collection vessel 312) and a solid residue in the crucible 307 that substantially consists only of the desired radionuclide (in this case, of copper-67). In this example, heating the crucible 307 will cause at least approximately 95% of metallic zinc-68 in the solid mixture to sublime, such that the solid residue will include at most approximately 5% of the metallic zinc-68 initially in the solid mixture, with the remaining solid residue being copper-67 and other trace metals. As such, as used herein, "substantially sublime" means that at least approximately 95% of the one or more metallic materials to be sublimed are in fact sublimed. On the other hand, when it is desired to substantially melt the sublimed components, the crucible block 316 is positioned in the closed position, and the one or more second heating elements 362 are configured to heat at least a portion of the collection vessel 312 to a second pre-determined temperature that substantially melts the metal vapor and directs the liquefied metal back into the crucible 307. Likewise, as used herein, "substantially melt" means that at least approximately 95% of the sublimed components to be melted are in fact liquefied.

Figure 6:
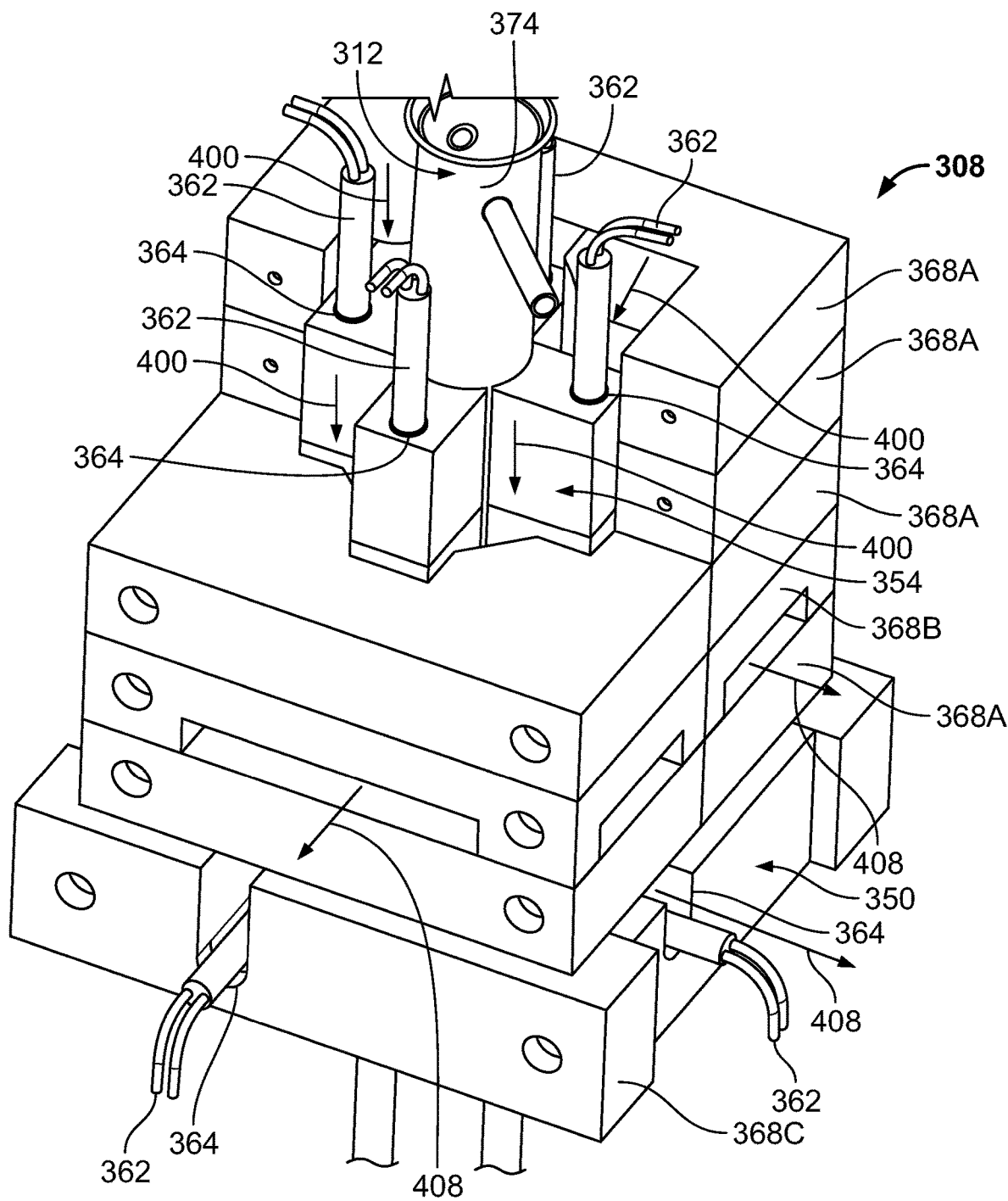
FIG. 6 is a perspective view of a heating block of the sublimation apparatus of FIGS. 3-5, but with insulation blocks removed for clarity.
Figure 7:
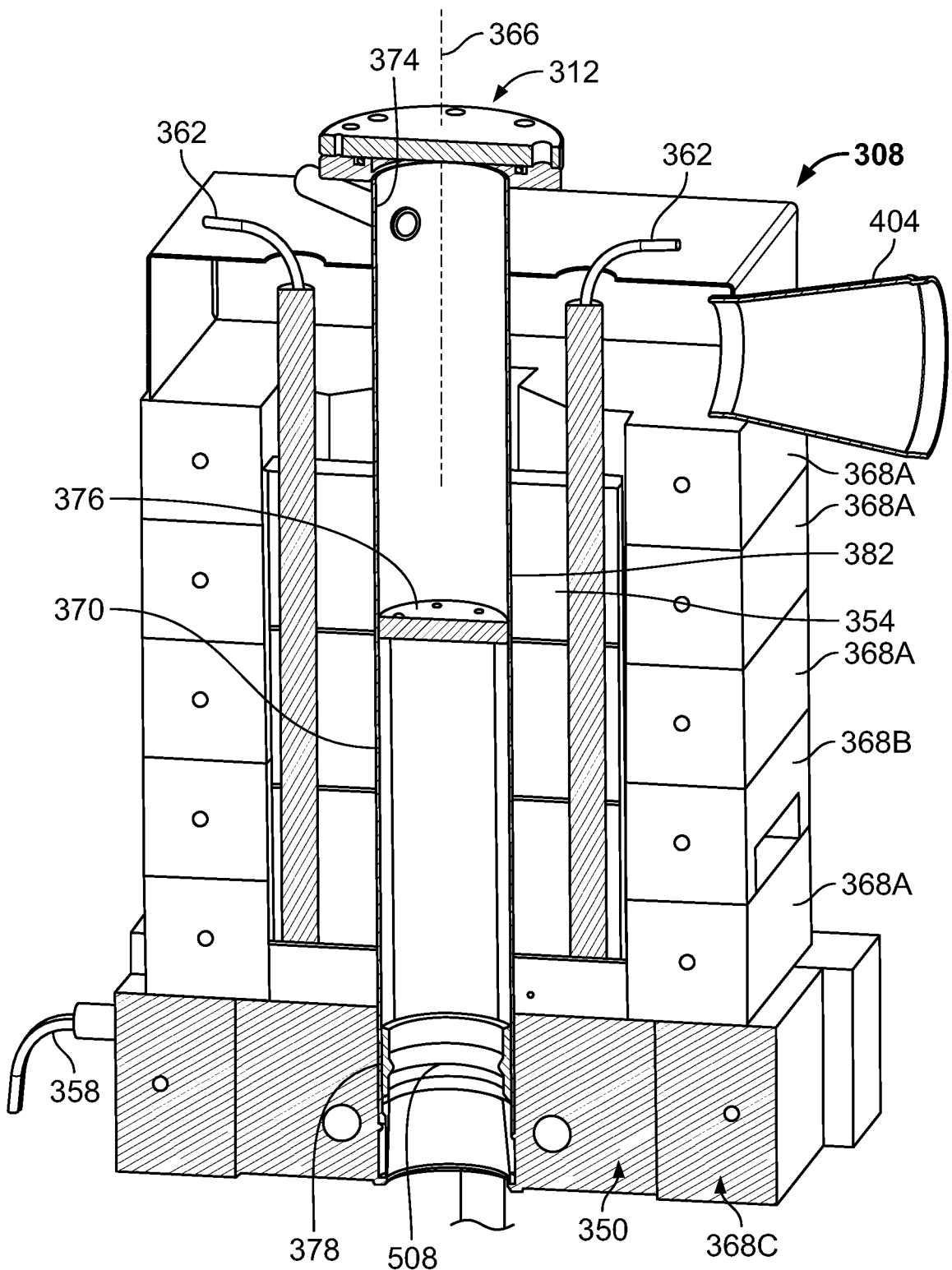
FIG. 7 is a cross-sectional view of the heating block of the sublimation apparatus of FIGS. 3-5.
Figure 8:
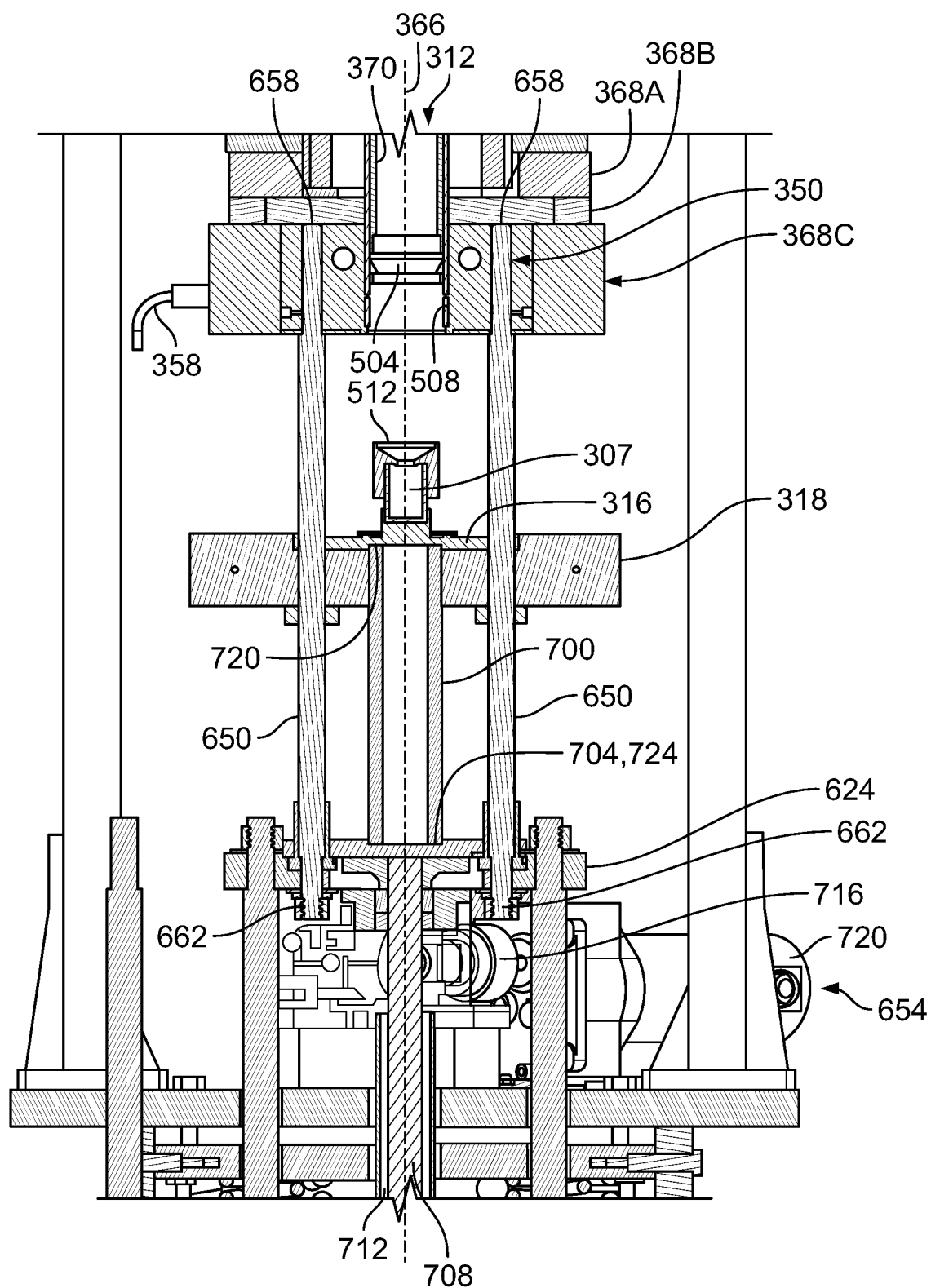
FIG. 8 illustrates a crucible block of the sublimation apparatus of FIGS. 3-5 in an open position.

The crucible block 316 is generally configured to receive the crucible 307 and to retain the crucible 307 as the crucible block 316 is moved between the open and closed positions. As best illustrated in FIGS. 6 and 7, the crucible block 316 is at least partially, if not entirely, surrounded by an insulation block 318, such that the crucible block 316 is thermally insulated from the ambient environment. As best illustrated in FIGS. 8-11, the crucible block 316 in this example takes the form of an integral flange portion that is specifically configured to receive and retain the crucible 307 in this manner. To this end, the integral flange portion 316 has a perimeter wall 320 and a cavity 324 defined by the perimeter wall 320. The cavity 324 is sized to receive a portion of the crucible 307 therein, and, in turn, the perimeter wall 320 is configured to retain the crucible 307 in the cavity 324.

In this example, the first and second heating blocks 350, 354 respectively define two heating zones that are operable independently of one another. The one or more lower heating elements 358 introduced above are configured to selectively generate heat having the first pre-determined temperature, which is sufficient to at least partially sublime the solid mixture in the crucible 307. In some examples, e.g., when the solid mixture is the isotope-enriched metal target comprising zinc-68 and copper-67, the first pre-determined temperature will be equal to between approximately 650 degrees Celsius and 700 degrees Celsius, which is sufficient to substantially sublime the zinc-68 in the solid mixture. In other examples, however, the first pre-determined temperature may be less than 650 degrees Celsius (e.g., approximately 200 degrees Celsius or approximately 450 degrees Celsius), depending upon the internal pressures. Likewise, the one or more upper heating elements 362 introduced above are configured to selectively generate heat having the second pre-determined temperature, which is sufficient to liquefy, or melt, the metal collected in 312. In some examples, the second pre-determined temperature will be equal or substantially equal to the first pre-determined temperature (e.g., between approximately 650 degrees Celsius and 700 degrees Celsius), though in other examples, the second pre-determined temperature may be less than the first pre-determined temperature.

In this example, the lower heating block 350 includes four lower heating elements 358 and the upper heating block 354 also includes four upper heating elements 362, though the exact number of lower and upper heating elements 358, 362 can vary. Each of the lower and upper heating elements 358, 362 preferably takes the form of a cartridge heater (e.g., having a power rating of 125 W) disposed in a pocket 364 formed in the lower heating block 350 or the upper heating block 354, with the lower cartridge heaters 358 generally oriented horizontally (i.e., perpendicular to a longitudinal axis 366 of the sublimation apparatus 300), and with the upper heating cartridges 362 generally oriented vertically (i.e., parallel to the longitudinal axis 366). In other examples, however, the lower and/or upper heating cartridges can be arranged in a different manner and/or different heating elements can be used. For example, heat pumps, heat pipes, or electrical resistance wires can be used instead of the heating cartridges.

Thus, in this example, the lower heating block 350 defines a first (or lower) heating zone configured to heat a first (or lower) portion of the sublimation apparatus 300 to the first pre-determined temperature, and the upper heating block 354 defines a second (or upper) heating zone that is thermally insulated from the first heating zone and is configured to heat a second (or upper) portion of the sublimation apparatus 300 to the second pre-determined temperature. The second heating zone is generally thermally insulated from the first heating zone (and vice-versa) via a plurality of insulation blocks (e.g., made of Marinite). In this example, the plurality of insulation blocks includes four identical solid insulation blocks 368A surrounding the upper heating block 354 (and, more particularly, the one or more upper heating elements 362), a partially open insulation block 368B surrounding the upper heating block 354, and a solid insulation block 368C surrounding the lower heating block 350. Preferably, the partially open block 368B is disposed between two adjacent solid insulation blocks 368A, as will be discussed in greater detail below, though in some examples, the partially open block 368B can be disposed between one of the solid insulation blocks 368A and the solid insulation block 368C. In any event, because the first and second heating zones are thermally insulated from one another, the first and second portions of the sublimation apparatus 300 can be heated to different temperatures at different times. For example, the first portion of the sublimation apparatus 300 can be heated (e.g., to the first temperature) while the second portion of the sublimation apparatus 300 is not heated (or is cooled) Likewise, the second portion of the sublimation apparatus can be heated (e.g., to the second temperature) while the first portion of the sublimation apparatus 300 is not heated. The first and second zones can also be heated at the same time (to the same temperature or different temperatures) if desired.

The collection vessel 312 is generally configured to collect the metal vapor produced when the lower heating block 350 heats the solid mixture to the first pre-determined temperature. As best illustrated in FIGS. 6 and 7, the collection vessel 312 in this example takes the form of a telescoping tube that is made of alumina (but can be made of another ceramic material or graphite) and has a first cylindrical portion 370 that is disposed in a second cylindrical portion 374, such that the first and second cylindrical portions 370, 374 are slidable relative to one another. The collection vessel 312 also includes a baffle 376 that is carried by the first cylindrical portion 370 and includes a plurality of holes that fluidly couple the first cylindrical portion 370 and the second cylindrical portion 374 (albeit to a limited degree, because of the size of the holes). In this example, the baffle 376 is located approximately halfway between a bottom end of the first cylindrical portion 370 and a top end of the second cylindrical portion 374, such that the baffle 376 is located approximately in the middle of the upper heating block 354. In other examples, however, the baffle 376 can be located closer to the top end of the second cylindrical portion 374. For example, the baffle 376 can instead be located immediately adjacent the top end of the second cylindrical portion 374.

As best illustrated in FIGS. 6 and 7, the collection vessel 312 is disposed within a central opening 378 of the lower heating block 350 and a central opening 382 of the upper heating block 354 that is co-axial with the central opening 378, both of which extend along the longitudinal axis 366.

The lower heating block 350 surrounds lower portions of both the first and second cylindrical portions 370, 374, as well as a portion of the crucible block 316 (when the crucible block 316 is in the closed position). Accordingly, when the lower heating elements 358 generate heat, the lower heating elements 358 are configured to heat at least the lower portion of both the first and second cylindrical portions 370, 374, as well as the crucible block 316 (when the crucible block 316 is in the closed position), as will also be discussed in greater detail below. Meanwhile, the upper heating block 354 surrounds an upper portion of the first cylindrical portion 370 and at least a middle portion of the second cylindrical portion 374. Accordingly, when the upper heating elements 362 generate heat, the upper heating elements 362 are configured to heat at least the upper portion of the first cylindrical portion 370 and the middle portion of the second cylindrical portion 374, as will be discussed in greater detail below.

Preferably, the sublimation apparatus 300 also include means for selectively and controllably cooling the second heating zone (and, more particularly, the upper portion of the first cylindrical portion 370) to, for example, facilitate or expedite the sublimation process when the first heating zone is heating the first (or lower) portion of the sublimation apparatus 300 to the first pre-determined temperature. To this end, the means for selectively cooling the second heating zone can cool the second heating zone to one or more temperatures less than the first pre-determined temperature. In some examples, the means for selectively cooling the second heating zone can cool the second heating zone to a plurality of different temperatures that decrease as the second heating zone moves away from the lower heating block 350. For example, the means for selectively cooling the second heating zone can cool the second heating zone to four different temperatures, e.g., less than 30 degrees Celsius, less than 50 degrees Celsius, less than 70 degrees Celsius, and less than 120 degrees Celsius, as the second heating zone moves away from the lower heating block 350. In any event, it will be appreciated that the temperature(s) can be adjusted as needed in order to control the sublimation process and the location within the collection vessel in which the vapor will condense.

The sublimation apparatus 300 in this example includes such a means, in the form of one or more cooling passages 400, an air blower 404, and one or more discharge passages 408. Preferably, the sublimation apparatus 300 includes four cooling passages 400 generally arranged about the perimeter of the upper heating block 354 (see FIG. 6), though in other examples, the sublimation apparatus 300 can include more or less cooling passages 400. The one or more cooling passages 400 are defined between the upper heating block 354 and the insulation blocks 368, such that the one or more cooling passages 400 are immediately adjacent and thermally coupled to the upper heating block 354. In turn, the one or more cooling passages 400 generally extend in a direction along the longitudinal axis 366. Meanwhile, the air blower 404 is fluidly coupled to the one or more cooling passages 400 and configured to selectively direct cooling fluid, e.g., air or water from a source of cooling fluid (not shown) into the sublimation apparatus 300 and into the one or more cooling passages 400, thereby cooling the upper heating block 354 (as well as the upper portion of the first cylindrical portion 370). In this example, the air blower 404 extends through and partially outward from the insulation blocks 368 at a position immediately adjacent an upper portion of the second cylindrical portion 374. Preferably, the sublimation apparatus 300 includes four discharge passages 408 (see FIG. 6), though in other examples, the sublimation apparatus 300 can include more or less discharge passages 408. The one or more discharge passages 408 are fluidly coupled to the one or more cooling passages 400 in order to exhaust any cooling fluid that is provided to and flows through the one or more cooling passages 400 (via the air blower 404). In this example, the one or more discharge passages 408 are defined between the partially open insulation block 368B and the lowermost solid insulation block 368A, such that the one or more discharge passages 408 are positioned upstream of the lower heating elements 358. In this manner, any cooling fluid that is exhausted from the cooling passages 400 (and any heat pulled from the upper heating block 354 in turn) does not affect the temperature of the lower heating block 350 (or the first heating zone).

Figure 9:
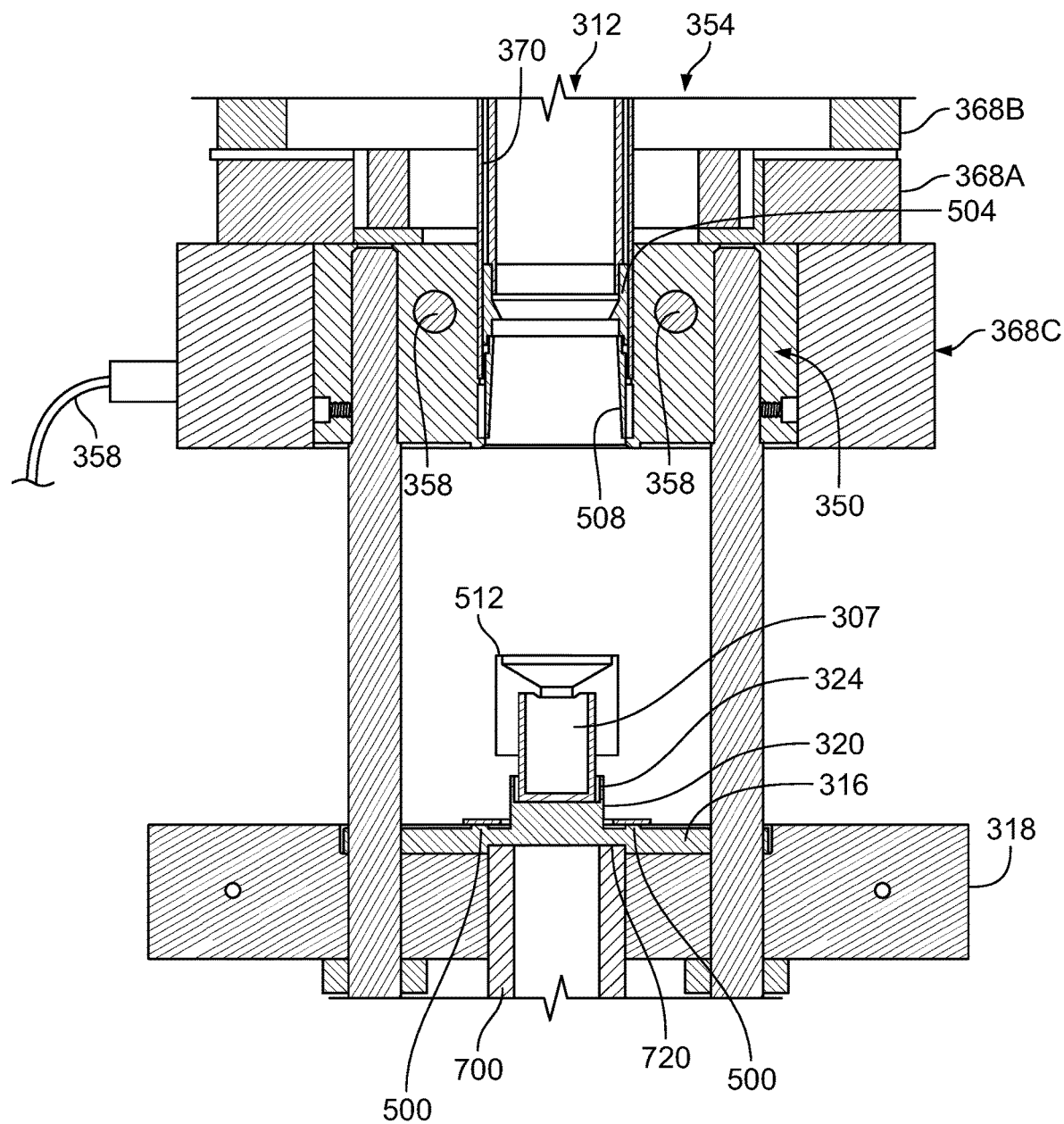
FIG. 9 is a close-up view of the crucible block in the open position.
Figure 10:
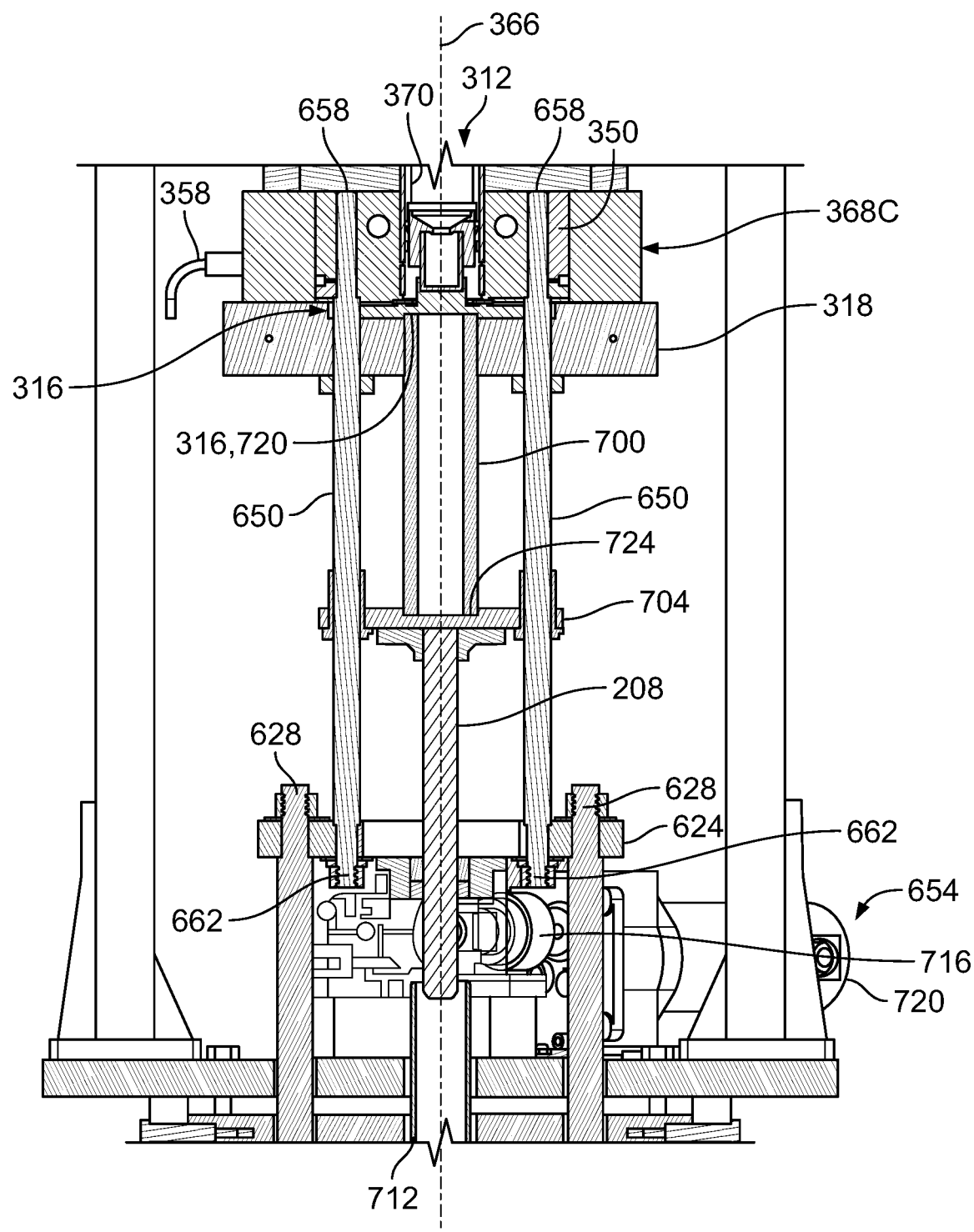
FIG. 10 illustrates the crucible block of the sublimation apparatus of FIGS. 3-5 in a closed position.
Figure 11:
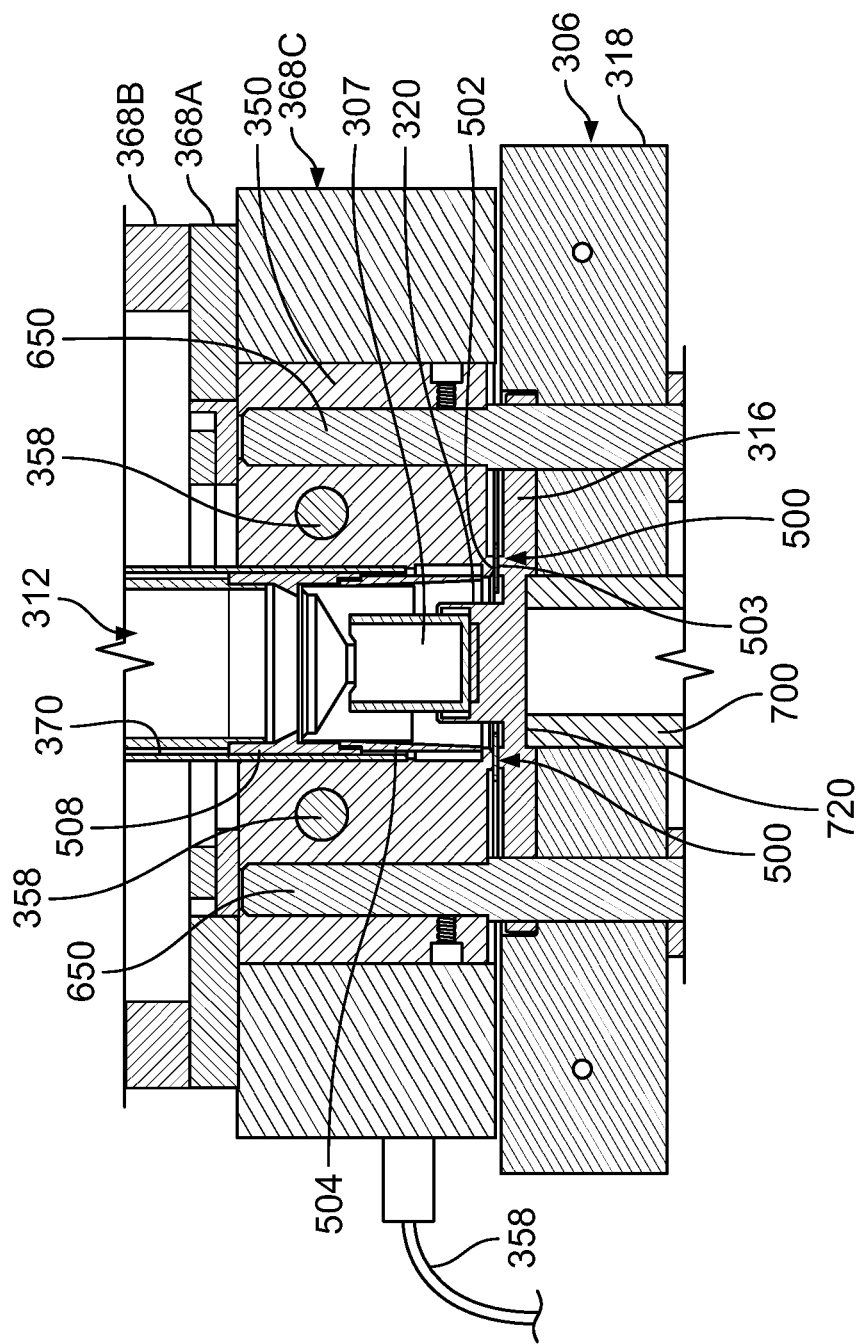
FIG. 11 is a close-up view of the crucible block in the closed position.

As best illustrated in FIGS. 9 and 11, the sublimation apparatus 300 in this example also includes a sealing element 500. The sealing element 500 is generally configured to seal the crucible 307 within the lower heating block 350 and from the ambient environment when the crucible block 316 is in the closed position. In this example, the sealing element 500 takes the form of a grafoil gasket (e.g., a high purity grafoil gasket or a reactor grade grafoil gasket) that is capable of withstanding higher temperatures, such as the first pre-determined temperature described herein, for partially subliming the solid mixture contained in the crucible 307. In other examples, however, the sealing element 500 can instead take the form of a C-seal or other type of sealing element and/or can instead be made of, for example, aluminum or gold. In any event, the sealing element 500 is carried by the crucible block 316 such that the sealing element 500 surrounds the perimeter wall 320 of the integral flange portion 316. Thus, when the crucible block 316 is in the closed position, the sealing element 500 sealingly engages a bottom portion of the lower heating block 350 and prevents any materials (or heat) from escaping the sublimation apparatus 300 (e.g., between the crucible block 316 and the lower heating block 350). As best illustrated in FIG. 11, when the crucible block 316 is in the closed position, the sealing engagement is enhanced by the fact that the sealing element 500 is pinched by and between first and second opposite protrusions 502, 503 formed on the lower heating block 350 and the crucible block 316, respectively. In other examples, e.g., when the sealing element 500 takes the form of a C-seal or other type of sealing element, the sealing element 500 can be disposed in a groove that helps to pinch the sealing element 500 in the desired position.

As also best illustrated in FIGS. 9 and 11, the sublimation apparatus 300 in this example further includes a collar 504 and a spacer 508. The collar 504 is disposed in the collection vessel 312 (and, more particularly, matingly engages the first cylindrical portion 370) and acts as a barrier that prevents a chemical reaction between the metal being sublimed (in this case zinc-68) and the material of the lower heating block 350 (in this case Stainless Steel), which could damage the components of the sublimation apparatus 300 and cause a loss of the sublimed material. In this example, the collar 504 matingly engages a bottom portion of the first cylindrical portion 370 such that the collar 504 is fixedly disposed in the collection vessel 312. In other examples, however, the collar 504 can instead be movably disposed in the collection vessel 312 such that the collar 504 occupies a first position when the crucible block 316 is in the open position and occupies a second position when the crucible block 316 is in the closed position. Meanwhile, the spacer 508 is sized and arranged to help maintain the sealing element 500 in the desired position against the integral flange portion 316. In this example, the spacer 508 matingly engages the collar 504 such that the spacer 508 is fixedly disposed between the sealing element 500 and the collar 504. In turn, as illustrated in FIG. 11, the spacer 508 is surrounded by the lower heating block 350 and the spacer 508 surrounds the perimeter wall 320 of the integral flange portion 316 (and, in turn, the crucible 307) when the crucible block 316 is in the closed position.

Optionally, the sublimation apparatus 300 in this example further includes a funnel 512 that is coupled to the crucible 307 to help to direct melted metal that had sublimed (condensed metal vapor collected in the collection vessel 312) back into the crucible 307 (or into a new crucible 307) when desired. In this example, the funnel 512 is coupled to the crucible 307 such that the funnel 512 receives and surrounds a portion of the perimeter wall 320. In turn, the funnel 512 is movable along with the crucible 307 (and the crucible block 316), relative to the collar 504 and the spacer 508, as the crucible block 316 is moved between the open and closed positions. As the crucible block 316 is moved towards and into the open position, the spacer 508 helps to guide the funnel 512 (as well as the crucible 307) into the proper position. When the crucible block 316 reaches and is in the closed position shown in FIGS. 10 and 11, the funnel 512 is disposed within the collection vessel 312 and engages both the collar 504 and the spacer 508 such that the funnel 512 is substantially disposed between the collar 504 and the spacer 508. Conversely, when the crucible block 316 is in the open position shown in FIGS. 8 and 9, the funnel 512 is also disposed outside of the collection vessel 312, such that the funnel 512 is spaced from both the collar 504 and the spacer 508.

Figure 12:
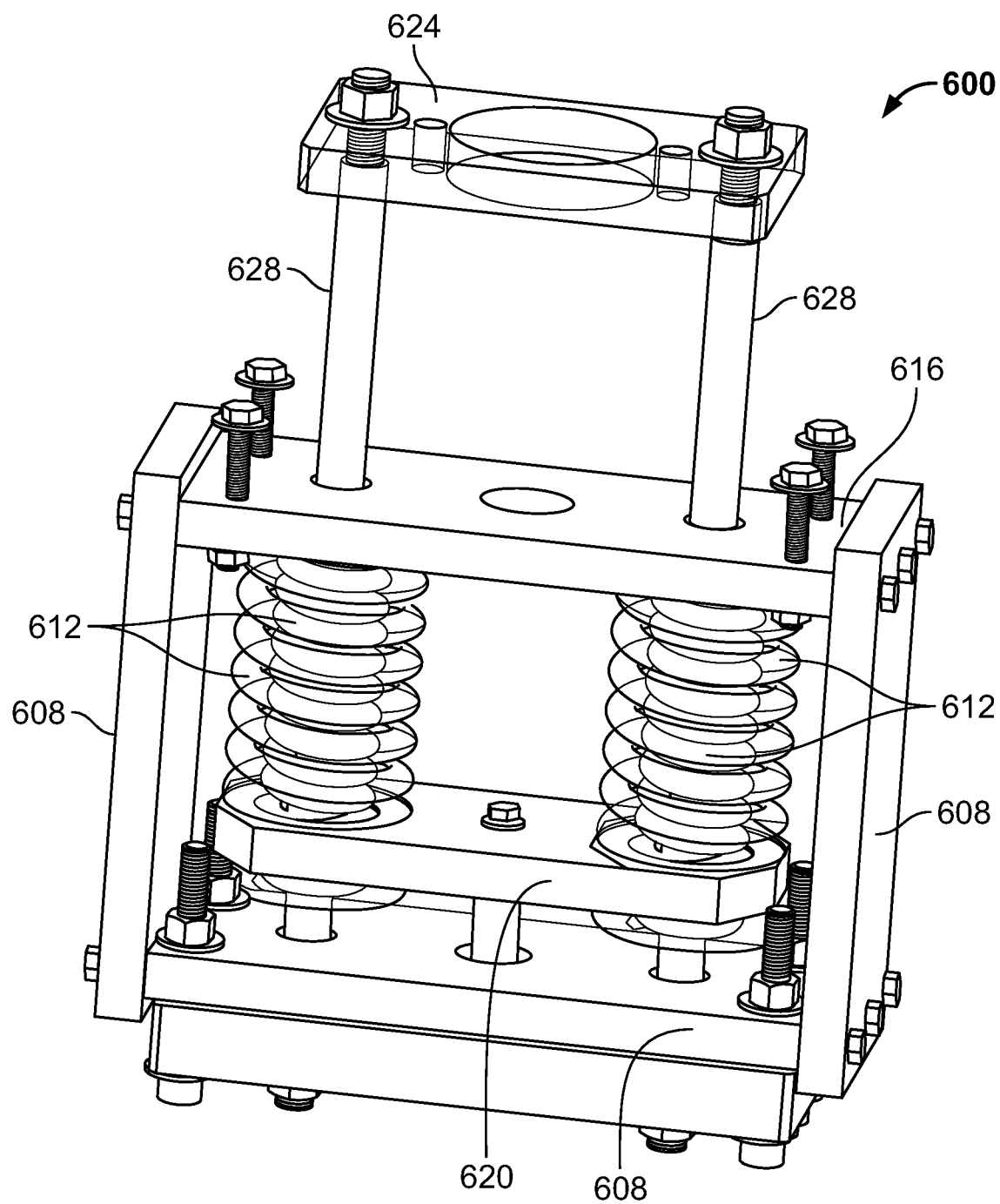
FIG. 12 is a perspective view of a compensator assembly of the sublimation apparatus of FIGS. 3-5.
Figure 13:
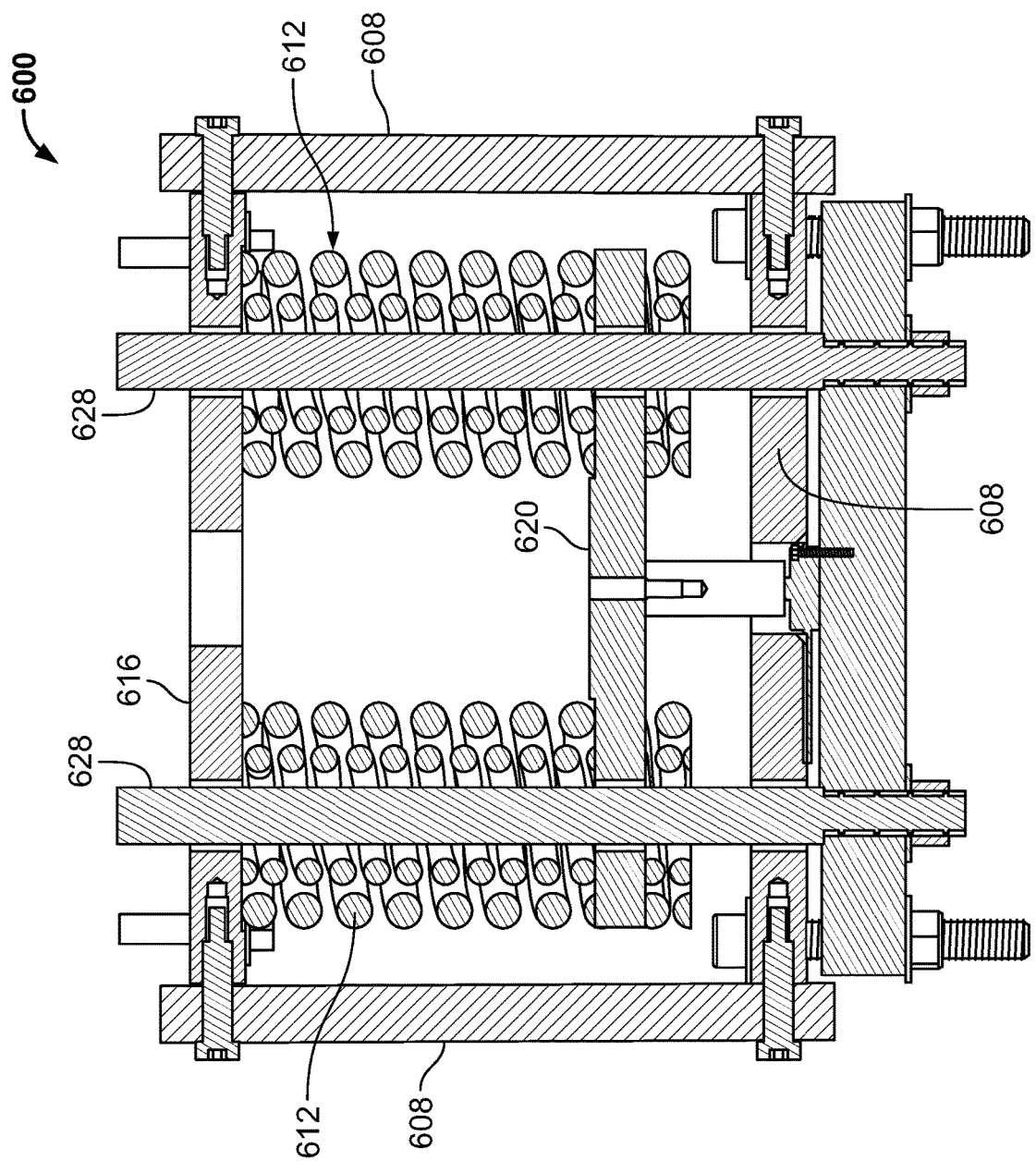
FIG. 13 is a partial, cross-sectional view of the compensator assembly of FIG. 12.

Turning now to FIGS. 12 and 13, the sublimation apparatus 300 in this example further includes a compensator assembly 600 that is operatively coupled to the crucible block 316. The compensator assembly 600 is generally configured to maintain a relatively constant load on the sealing element 500 in order to compensate for thermal expansion and seal creep conditions during operation of the sublimation apparatus 300. In this example, the compensator assembly 600 includes a plurality of compensator housing plates 608, two pairs of compensator springs 612, and upper and lower spring plates 616, 620 for retaining the compensator springs 612. The compensator housing plates 608 are coupled (e.g., bolted) together so as to form a housing for the springs 612. The compensator springs 612 are disposed in this housing such that the compensator springs 612 of each pair of compensator springs 612 are concentrically arranged, with one end of each compensator spring 612 seated against the upper spring plate 616, which is fixedly coupled to the housing. However, as best illustrated in FIGS. 12 and 13, the other end of each compensator spring 612 extends through a respective opening formed through the lower spring plate 616, which is movable within the housing to adjust the total load (i.e., spring force) generated by the pair of compensator springs 612.

The compensator assembly 600 in this example also includes a shaft plate 624 and a pair of spring shafts 628 that extend between and connect a bottom one of the compensator housing plates 608 and the shaft plate 624. Each of the spring shafts 628 extends in a direction parallel to the longitudinal axis 366. As illustrated in FIGS. 12 and 13, each of the spring shafts 628 is at least partially surrounded by a respective one of the pairs of compensator springs 612. Accordingly, the total load generated by the two pairs of compensator springs 612 is subsequently transferred to the pair of spring shafts 624, which in turn transfers the total load to the shaft plate 624.

With reference now to FIGS. 4, 5, 8, and 10, the sublimation apparatus 300 in this example also includes a plurality of compensator shafts 650 and a drive assembly 654. The plurality of compensator shafts 650 are generally configured to operably couple the compensator assembly 600 to the crucible block 316. As best illustrated in these FIGS., the plurality of compensator shafts 650 are arranged so that a first end 658 of each shaft 650 is disposed in and fixed to the lower heating block 350 and a second end 662 of each shaft 650 extends through and is fixed to the shaft plate 624. Because the plurality of compensator shafts 650 are fixed in this way, the total load generated by the two pairs of compensator springs 612 and transferred to the shaft plate 624 is likewise transferred to the compensator shafts 650, which in turn apply a first force on the sealing element 500 in a first direction (downwards in this case), away from the lower heating block 350. Each of the compensator shafts 650 extends in a direction parallel to the longitudinal axis 366, such that the crucible block 316 is movable along the plurality of compensator shafts 650 (via apertures formed in the crucible block 316) as the crucible block 316 moves between the open position and the closed position.

Like the plurality of compensator shafts 650, the drive assembly 654 is also operably coupled to the crucible block 316, but so as to drive movement of the crucible block 316 between the open position and the closed position along the plurality of compensator shafts 650. In this example, the drive assembly 654 takes the form of a jack assembly including a jack tube 700, a jack plate 704, a jack shaft 708, an extension tube 712, and a screw jack 716, along with a drive motor 720 configured to drive the components of the jack assembly to achieve the desired movement of the crucible block 316. Moreover, the drive assembly 654 is configured to generate a second force that is applied (via the jack tube 700) on the sealing element 500 in a second direction (upwards in this case), towards the lower heating block 350.

As best illustrated in FIGS. 4, 5, 8, and 9, the jack tube 700 is fixedly coupled to the crucible block 316 such that the jack tube 700 and the crucible block 316 move together in unison along the longitudinal axis 366. More particularly, the jack tube 700 has a first end 720 that is fixedly coupled against a bottom surface of the integral flange portion 316. The jack tube 700 also has a second end 724 that is fixedly coupled to the jack plate 704, such that the jack tube 700 and the jack plate 704 also move together in unison along the longitudinal axis 366. While somewhat difficult to see, but best seen in FIGS. 8 and 10, the jack plate 704 has a pair of shaft openings 728 sized to receive the pair of compensator shafts 650, which respectively extend therethrough.

The jack shaft 708 is fixedly coupled to the jack plate 704 such that the jack shaft 708 also moves in unison with the jack plate 704 (and the jack tube 700 and the crucible block 316). More particularly, the jack shaft 708 has a first end fixedly coupled to a surface of the jack plate 704 opposite the second end 724 of the jack tube 700. On the other hand, the jack shaft 708 has a second end that is movably (e.g., slidably) disposed within the extension tube 712, which is fixed in place (e.g., by the upper spring plate 616). Thus, the crucible block 316, the jack tube 700, the jack plate 704, and the jack shaft 708 are all movable relative to the extension tube 712 by moving the second end of the jack shaft 708 further within or further outside of the extension tube 712 along the longitudinal axis 366.

The screw jack 716 is operably coupled to a portion of the jack shaft 708 in a known manner so as to control the position of the second end of the jack shaft 708 (and the crucible block 316) relative to the extension tube 712. Likewise, the drive motor 720 is operably coupled to the screw jack 716 so as to control the screw jack 716, and, in turn, the position of the second end of the jack shaft 708 relative to the extension tube 712. In this example, the drive motor 720 is a direct current (DC) motor having a variable speed controller. In other examples, however, the drive motor 720 can be an alternating current motor. Moreover, in this example, there is a large gear ratio from the drive motor 720 to the jack shaft 708 in order to prevent overloading by the jack assembly. Optionally, in this example, the drive assembly 654 also includes a slip clutch arranged between the screw jack 716 and the drive motor 720. The slip clutch helps to control the torque between the screw jack 716 and the drive motor 720 in order to further prevent overloading by the jack assembly.

In some examples, such as the example illustrated in FIGS. 3-13, the sublimation apparatus 300 includes a support structure 750 configured to retain and support the components of the sublimation apparatus 300. As best illustrated in FIGS. 4 and 5, the support structure 750 in this example takes the form of a table having a plurality of legs 754, a first support 758 coupled to the plurality of legs 754, and a second support 762 coupled to the plurality of legs 754. As best illustrated in FIGS. 4 and 5, the compensator assembly 600 is generally disposed between the first and second supports 758, 762. More particularly, a bottom housing plate 608 of the plurality of compensator housing plates 608 is directly coupled (e.g., bolted) to the first support 758, and a top housing plate 608 of the plurality of compensator housing plates 608 is directly coupled (e.g., bolted) to the second support 762, with the remaining compensator housing plates 608, the pair of compensator springs 612, and the upper and lower spring plates 616, 620 disposed between the first and second supports 758, 762. However, the second support 762 includes a pair of apertures through which the pair of spring shafts 628 respectively extend, such that the shaft plate 624 is disposed above the second support 762 and the pair of spring shafts 628 are partially disposed above the second support 762. On the other hand, the drive assembly 654 is generally coupled to and disposed above the second support 762. More particularly, the screw jack 716 and the drive motor 720 are directly coupled to the second support 762, the jack tube 700 and the jack plate 704 are disposed above the second support 762, and the jack shaft 708 and the extension tube 712 are partially disposed above the second support 762.

As discussed above, the sublimation apparatus 300 is configured to purify and isolate one or more radionuclide (in this example copper-67) while being controlled remotely from outside the shielded environment 304. To this end, the sublimation apparatus 300 includes a local control system 800 that is communicatively connected (via a wired or wireless connection) to the sublimation apparatus 300 in order to control operation of the sublimation apparatus 300. More particularly, the local control system 800 is configured to control the temperatures and heat rate within the sublimation apparatus 300 by controlling the lower heating elements 358, the upper heating elements 362, the air blower 404, the drive assembly 654, and other components (e.g., sensors, switches) of the sublimation apparatus 300.

In this example, the local control system 800 includes a local controller 804, a plurality of sensors communicatively connected to the local controller 804, and a plurality of valves (e.g., a plurality of solenoid valves) communicatively connected to the local controller 804 to open, close, or otherwise adjust the components of the sublimation apparatus 300. The local controller 804, which is preferably a J-KEM controller, is communicatively connected to the lower heating elements 358, the upper heating elements 362, the air blower 404, the drive motor 720, the plurality of sensors, and the plurality of valves, such that the local controller 804 can control operation of the sublimation apparatus 300. The local controller 804 can, in turn, be communicatively connected (via a wired or wireless connection) to and automatically controlled by a remotely located controller (e.g., a central controller located outside of the shielded environment 304) or can be manually controlled by an operator located outside of the shielded environment 304.

The plurality of sensors are generally coupled to components of the sublimation apparatus 300 in order to sense pressure, temperature, force, and other variables within the sublimation apparatus 300. In this example, the plurality of sensors include a plurality of load cells, a plurality of thermocouples, and a pressure gauge that measures the pressure in the collection vessel 312. While not illustrated herein, the plurality of load cells are distributed throughout the compensator assembly 600 in order to detect the total load generated by the compensator assembly 600. While also not illustrated herein, the plurality of thermocouples are disposed in the lower heating block 350 and the upper heating block 354 in order to detect the temperature(s) and heat rate in the lower heating block 350 and the upper heating block 354, respectively. In other examples, however, the plurality of sensors can include different and/or additional sensors. In any event, the local controller 804 can in turn, collect data from the sensors employed in the sublimation apparatus 300 for use in controlling the sublimation apparatus 300 to ensure that the sublimation and melting processes are being properly performed. For example, the local controller 804 can use temperature data from a plurality of thermocouples in the lower heating block 350 and the upper heating block 354 in order to adjust the temperature of the heat generated by the lower heating elements 350 and the upper heating elements 354. The plurality of valves are also not illustrated herein, but include one or more valves to open and close the collection vessel 312 to vacuum pressure or to inert gas, depending upon the desired operation of the sublimation apparatus 300, as well as one or more valves to control the screw jack 716. In other examples, however, the plurality of valves can include different and/or additional valves.

When it is desired to operate the sublimation apparatus 300 to purify and substantially isolate copper-67 (or other radiopharmaceutical) from the isotope-enriched metal target comprising zinc-68 and copper-67 (or other metal target) contained in the crucible 307, the local controller 804 (in response to a request from the remotely located controller or the remotely located operator) generally causes the crucible block 316, which includes the crucible 307, to move from the open position to the closed position. The local controller 804 does so by activating the drive motor 720, which in turn drives rotation of the screw jack 716 in a first direction (e.g., a clockwise direction), which in turn causes the jack shaft 708 to move upwards, from the position shown in FIGS. 8 and 9 to the position shown in FIGS. 10 and 11. Because the jack tube 700 and the jack plate 704 move in unison with the jack shaft 708, this simultaneously causes the jack tube 700 and the jack plate 704 to move upwards, from the position shown in FIGS. 8 and 9 to the position shown in FIGS. 10 and 11. Because the crucible block 316 also moves in unison with the jack tube 700, this also simultaneously causes the crucible block 316 to move upwards, from the position shown in FIGS. 8 and 9 until the crucible block 316 reaches its closed position, shown in FIGS. 10 and 11. As discussed above, when the crucible block 316 is in the closed position, the crucible block 316 is at least partially disposed within the lower heating block 350. More particularly, the integral flange portion 316 is partially disposed within the lower heating block 350, such that the lower heating elements 358 are positioned immediately adjacent and substantially surround the crucible 307 carried by the integral flange portion 316. At the same time, the sealing element 500 sealingly engages the bottom portion of the lower heating block 350, and the collection vessel 312 is in fluid communication with the crucible 307, thereby creating a sealed process chamber that is within the collection vessel 312 and seals the crucible 307 from the ambient environment. The first and second forces, which are respectively generated and applied by the compensator shafts 650 and the drive assembly 654, also help to maintain this sealed process chamber when the sealing element 500 sealingly engages the bottom portion of the lower heating block 350. Further, while not illustrated, it will be appreciated that at some point before the sublimation process begins, the collection vessel 312 will be subjected to a dynamic or static vacuum by coupling a vacuum source to the second cylindrical portion 374 of the collection vessel 312.

In turn, the local controller 804 activates the lower heating elements 358, causing the lower heating elements 358 to produce heat having the first temperature, which heats the lower portion of the sublimation apparatus 300, particularly the integral flange portion 316 and the crucible 307, to the first pre-determined temperature (which is monitored by the plurality of thermocouples). As the solid mixture contained in the crucible 307 is heated to the first pre-determined temperature, substantially all (i.e., at least approximately 95%) of the zinc-68 in the solid mixture is converted into metal vapor that is collected by and condenses within the collection vessel 312, particularly within the upper portion of the first cylindrical portion 370 of the collection vessel 312. The conversion of the zinc-68 into metal vapor leaves the crucible 307 with the solid residue substantially consisting only of copper-67 (which has a lower vapor pressure than the zinc-68 at the first temperature and hence is not converted into vapor).

Generally speaking, while the lower heating elements 358 are producing heat having the first temperature to sublime substantially all of the zinc-68, the local controller 804 keeps the upper heating elements 362 off, such that the upper heating elements 362 do not provide any heat to the second heating zone. In some cases, it may be necessary to actually lower the temperature in the second heating zone in order to facilitate or expedite sublimation of the zinc-68. In these such cases, the local controller 804 activates the means for selectively cooling the second heating zone. More particularly, the local controller 804 causes the air blower 404 to draw in cooling fluid, which is subsequently routed through the one or more cooling passages 400, thereby cooling the upper heating block 354 as well as the upper portion of the first cylindrical portion 370. The cooling fluid is then routed out of the second heating zone (and the sublimation apparatus 300) via the one or more discharge passages 408.

When the sublimation process is complete (i.e., substantially all of the zinc-68 has been sublimed, which in some cases takes a minimum of 100 minutes but in other cases takes between 200 and 230 minutes), the local controller 804 causes one or more of the valves to open and return the collection vessel 312 to ambient pressure and then generally causes the crucible block 316 to move from the closed position back to the open position. The local controller 804 does so by again activating the drive motor 720, but this time so as to drive rotation of the screw jack 716 in a second direction (e.g., a counter-clockwise direction), which in turn causes the jack shaft 708 to move downwards, from the position shown in FIGS. 10 and 11 to the position shown in FIGS. 8 and 9. Movement of the jack shaft 708 in this manner simultaneously causes the jack plate 704, the jack tube 700, and the crucible block 316 to move downwards, from the position shown in FIGS. 10 and 11 to the position shown in FIGS. 8 and 9. As discussed above, when the crucible block 316 is in the open position, the crucible block 316 is spaced from the lower heating block 350 and the collection vessel 312. Likewise, the jack tube 700 and the jack plate 704 are spaced from the lower heating block 350 and the collection vessel 312, with the jack plate 704 located approximately halfway between the lower heating block 350 and the shaft plate 624.

When the crucible block 316 is back in the open position, the crucible 307 can be removed (e.g., via the manipulators described above or other robot means), and the solid residue contained therein subjected to further processing in order to fully purify and isolate the copper-67. At the same time, if desired, the sublimation apparatus 300 can be operated to melt the zinc-68 condensed within the collection vessel 312 (more particularly solidified on an internal sidewall of the first cylindrical portion 370) and to collect the melted zinc-68 in a new crucible 307 installed on the crucible block 316. To this end, the local controller 804 again causes the crucible block 316, which now includes the new crucible 307, to move from the open position back to the closed positon just as described above. The local controller 804 activates the upper heating elements 362, causing the upper heating elements 362 to produce heat having the second pre-determined temperature, which heats the upper portion of the sublimation apparatus 300, particularly the upper portion of the first cylindrical portion 370 and the middle portion of the second cylindrical portion 374, to the second pre-determined temperature. The local controller 804 may also activate the lower heating elements 358, causing the lower heating elements 358 to produce heat having the first pre-determined temperature, which is sufficient to at least help melt the zinc-68 and which heats the lower portion of the sublimation apparatus 300, particularly the lower heating block 350, to the first pre-determined temperature (which may be the same as or different than the second pre-determined temperature). At some point before this happens, the collection vessel 312 (particularly the second cylindrical portion 374) is back-filled with an inert gas, e.g., argon, helium, nitrogen (or any combination of these gases) or any combination of these gases mixed with hydrogen. In turn, the zinc-68 that has condensed in the collection vessel 312 is heated, thereby converting substantially all of the zinc-68 from solid to liquid. The liquefied zinc-68 subsequently falls in the collection vessel 312 and is directed by the collar 504 and the funnel 512 into the new crucible 307. The liquefied zinc-68 collected by the new crucible 307 can then be solidified by allowing the system to return to ambient temperature and can in turn be recycled or re-used in further production of a radionuclide and further sublimation processes.

It will be appreciated that the sublimation and melting processes described herein can be repeated any number of times with any number of different crucibles and different solid mixtures. It will also be appreciated that the sublimation apparatus 300 can include a number of other components not specifically illustrated herein. In some examples, the sublimation apparatus 300 can include a fan that helps to maintain the compensator assembly 600 at the ambient temperature.

The following list of aspects reflects a variety of the embodiments explicitly contemplated by the present application. Those of ordinary skill in the art will readily appreciate that the aspects below are neither limiting of the embodiments disclosed herein, nor exhaustive of all the embodiments conceivable from the disclosure above, but are instead meant to be exemplary in nature.

1. A sublimation apparatus adapted to be disposed in a shielded environment and configured to be controlled remotely from outside the shielded environment, the sublimation apparatus comprising: a crucible block adapted to retain a crucible containing a solid mixture comprising one or more radionuclides; a first heating block comprising one or more first heating elements configured to selectively generate heat having a first temperature sufficient to at least partially sublime the solid mixture; and a collection vessel coupled to the first heating block, wherein the crucible block is movable, relative to the first heating block, between an open position, in which the crucible block is spaced from the first heating block and the collection vessel, and a closed positon, in which the crucible block is at least partially disposed within the first heating block and the collection vessel is in fluid communication with the crucible, and wherein when the crucible block is in the closed position, the one or more first heating elements are configured to heat the crucible block to the first temperature, thereby heating the solid mixture and producing a vapor that is collected by the collection vessel and leaving a solid residue in the crucible that substantially consists only of the one or more radionuclides.

2. The sublimation apparatus of aspect 1, further comprising a second heating block thermally insulated from the first heating block, the first heating block comprising the one or more first heating elements configured to selectively generate the heat having the first temperature, and the second heating block comprising one or more second heating elements configured to selectively generate heat having a second temperature sufficient to melt the vapor collected by the collection vessel.

3. The sublimation apparatus of claim 2, wherein when the crucible block is in the closed position, the crucible block is at least partially disposed within the first heating block and the one or more first heating elements are configured to generate the heat having the first temperature to heat the crucible block to the first temperature.

4. The sublimation apparatus of aspect 2 or 3, wherein the second heating block surrounds an upper portion of the collection vessel.

5. The sublimation apparatus of any one of aspects 1 to 4, further comprising one or more cooling passages formed immediately adjacent the second heating block, the one or more cooling passages configured to selectively direct cooling fluid toward the collection vessel to facilitate condensation of the metal vapor.

6. The sublimation apparatus of any one of aspects 1 to 5, wherein the crucible block further comprises a sealing element configured to seal the crucible from the ambient environment when the crucible block is in the closed position.

7. The sublimation apparatus of aspect 6, further comprising a compensator assembly operatively coupled to the crucible block, the compensator assembly comprising one or more springs configured to apply a constant load on the sealing element.

8. The sublimation apparatus of aspect 7, further comprising a plurality of compensator shafts coupled to the first heating block and to the compensator assembly, wherein the crucible block is movable, relative to the first heating block, between the open position and the closed position via the plurality of compensator shafts.

9. The sublimation apparatus of any one of aspects 1 to 8, further comprising a drive assembly operably coupled to the crucible block to move the crucible block between the open position and the closed position.

10. The sublimation apparatus of aspect 9, wherein the drive assembly comprises a screw jack; a screw jack shaft operatively coupled to the screw jack and to the crucible block; and a drive motor configured to drive the screw jack to move the screw jack shaft, thereby moving the crucible block between the open position and the closed position.

11. The sublimation apparatus of aspect 10, further comprising a slip clutch installed between the drive motor and the screw jack.

12. A sublimation apparatus adapted to be disposed in a shielded environment and configured to be controlled remotely from outside the shielded environment, the sublimation apparatus comprising: a crucible block adapted to retain a crucible containing a solid mixture comprising one or more radionuclides; a lower heating block, the lower heating block comprising one or more lower heating elements configured to selectively generate heat having a first temperature sufficient to at least partially sublime the solid mixture; an upper heating block thermally insulated from the lower heating block; and a collection vessel coupled to the upper heating block, wherein the crucible block is movable, relative to the lower heating block, between an open position, in which the crucible block is spaced from the lower heating block and the collection vessel, and a closed positon, in which the crucible block is at least partially disposed within the lower heating block and the collection vessel is in fluid communication with the crucible, wherein when the crucible block is in the closed position, the one or more lower heating elements are configured to heat the crucible block to the first temperature, thereby heating the solid mixture and producing a metal vapor that is collected by the collection vessel and leaving a solid residue in the crucible that substantially consists only of the one or more radionuclides, and wherein the upper heating block comprises one or more upper heating elements configured to selectively generate heat having a second temperature sufficient to melt the vapor in the collection vessel.

13. The sublimation apparatus of aspect 12, further comprising one or more cooling passages formed through the upper heating block, the one or more cooling passages configured to selectively direct cooling fluid toward the collection vessel to facilitate condensation of the metal vapor.

14. The sublimation apparatus of aspect 13, further comprising an air blower fluidly coupled to the one or more cooling passages and configured to direct the cooling fluid into the one or more cooling passages.

15. The sublimation apparatus of aspect 13 or 14, further comprising one or more discharge passages formed between the upper heating block and the lower heating block, the one or more discharge passages fluidly coupled to the one or more cooling passages to exhaust the cooling fluid.

16. The sublimation apparatus of any one of aspects 12 to 15, wherein the crucible block further comprises a sealing element configured to seal the crucible from the ambient environment when the crucible block is in the closed position.

17. The sublimation apparatus of aspect 16, further comprising a compensator assembly operatively coupled to the crucible block, the compensator assembly comprising one or more springs configured to apply a constant load on the sealing element.

18. The sublimation apparatus of aspect 17, further comprising a plurality of compensator shafts coupled to the heating block and to the compensator assembly, wherein the crucible block is movable, relative to the heating block, between the open position and the closed position via the plurality of compensator shafts.

19. The sublimation apparatus of aspect 12, further comprising a drive assembly operably coupled to the crucible block to move the crucible block between the open position and the closed position.

20. The sublimation apparatus of aspect 12, wherein the second temperature is substantially equal to the first temperature.

21. A sublimation apparatus adapted to be disposed in a shielded environment and configured to be controlled remotely from outside the shielded environment, the sublimation apparatus comprising: a crucible block adapted to retain a crucible containing a solid mixture comprising one or more radionuclides; a lower heating block comprising one or more lower heating elements configured to selectively generate heat having a first temperature sufficient to at least partially sublime the solid mixture; an upper heating block thermally insulated from the lower heating block; a collection vessel coupled to the upper heating block, the upper heating block comprising one or more upper heating elements configured to selectively generate heat to heat the collection vessel; and one or more cooling passages formed through the upper heating block, the one or more cooling passages configured to selectively direct cooling fluid or gas toward the collection vessel to facilitate condensation of the metal vapor, wherein the crucible block is movable, relative to the lower heating block, between an open position, in which the crucible block is spaced from the lower heating block and the collection vessel, and a closed positon, in which the crucible block is at least partially disposed within the lower heating block and the collection vessel is in fluid communication with the crucible, and wherein when the crucible block is in the closed position, the one or more lower heating elements are configured to heat the crucible block to the first temperature, thereby heating the solid mixture and producing a vapor that is collected by the collection vessel and leaving a solid residue in the crucible that substantially consists only of the one or more radionuclides.

22. A sublimation apparatus adapted to be disposed in a shielded environment and configured to be controlled remotely from outside the shielded environment, the sublimation apparatus comprising: a crucible block adapted to retain a crucible; a collection vessel comprising vapor condensate; and a heating block coupled to the collection vessel and comprising one or more heating elements configured to selectively generate heat having a temperature sufficient to melt the vapor condensate in the collection vessel, wherein the crucible block is movable, relative to the heating block, between an open position, in which the crucible block is spaced from the heating block and the collection vessel, and a closed positon, in which the collection vessel is in fluid communication with the crucible, wherein when the crucible block is in the closed position, the one or more heating elements are configured to heat the heating block surrounding the collection vessel and the crucible block to the first temperature, thereby melting substantially all of the metal vapor condensate in the collection vessel, and wherein the crucible collects the melted vapor condensate.

The invention claimed is:

1. A sublimation apparatus adapted to be disposed in a shielded environment and configured to be controlled remotely from outside the shielded environment, the sublimation apparatus comprising:
    a crucible block adapted to retain a crucible containing a solid mixture comprising one or more radionuclides;
    a first heating block comprising one or more first heating elements configured to selectively generate heat having a first temperature sufficient to at least partially sublime the solid mixture; and
    a collection vessel coupled to the first heating block;
    wherein the crucible block is movable, relative to the first heating block, between an open position, in which the crucible block is spaced from the first heating block and the collection vessel, and a closed position, in which the crucible block is at least partially disposed within the first heating block and the collection vessel is in fluid communication with the crucible, and
    wherein when the crucible block is in the closed position, the one or more first heating elements are configured to heat the crucible block to the first temperature, thereby heating the solid mixture and producing a vapor that is collected by the collection vessel and leaving a solid residue in the crucible that substantially consists only of the one or more radionuclides.

2. The sublimation apparatus of claim 1, further comprising a second heating block thermally insulated from the first heating block, the second heating block comprising one or more second heating elements configured to selectively generate heat having a second temperature sufficient to melt the condensate of the vapor collected by the collection vessel.

3. The sublimation apparatus of claim 2, wherein when the crucible block is in the closed position, the one or more second heating elements are configured to generate the heat having the second temperature to melt the condensate of the vapor collected by the collection vessel and direct the melted condensate of the vapor back into the crucible.

4. The sublimation apparatus of claim 2, wherein the second heating block surrounds an upper portion of the collection vessel.

5. The sublimation apparatus of claim 2, further comprising one or more cooling passages formed immediately adjacent to the second heating block, the one or more cooling passages configured to selectively direct cooling fluid toward the collection vessel to facilitate condensation of the metal vapor.

6. The sublimation apparatus of claim 1, wherein the crucible block further comprises a sealing element configured to seal the crucible from the ambient environment when the crucible block is in the closed position.

7. The sublimation apparatus of claim 6, further comprising a compensator assembly operatively coupled to the crucible block, the compensator assembly comprising one or more springs configured to apply a constant load on the sealing element.

8. The sublimation apparatus of claim 7, further comprising a plurality of compensator shafts coupled to the first heating block and to the compensator assembly, wherein the crucible block is movable, relative to the first heating block, between the open position and the closed position via the plurality of compensator shafts.

9. The sublimation apparatus of claim 1, further comprising a drive assembly operably coupled to the crucible block to move the crucible block between the open position and the closed position.

10. The sublimation apparatus of claim 9, wherein the drive assembly comprises:
a screw jack;
a screw jack shaft operatively coupled to the screw jack and to the crucible block; and
a drive motor configured to drive the screw jack to move the screw jack shaft, thereby moving the crucible block between the open position and the closed position.

11. The sublimation apparatus of claim 10, further comprising a slip clutch installed between the drive motor and the screw jack.

12. A sublimation apparatus adapted to be disposed in a shielded environment and configured to be controlled remotely from outside the shielded environment, the sublimation apparatus comprising:
a crucible block adapted to retain a crucible containing a solid mixture comprising one or more radionuclides;
a lower heating block, the lower heating block comprising one or more lower heating elements configured to selectively generate heat having a first temperature sufficient to at least partially sublime the solid mixture;
an upper heating block thermally insulated from the lower heating block; and
a collection vessel coupled to the upper heating block; and
wherein the crucible block is movable, relative to the lower heating block, between an open position, in which the crucible block is spaced from the lower heating block and the collection vessel, and a closed position, in which the crucible block is at least partially disposed within the lower heating block and the collection vessel is in fluid communication with the crucible,
wherein when the crucible block is in the closed position, the one or more lower heating elements are configured to heat the crucible block to the first temperature, thereby heating the solid mixture and producing a vapor that is collected by the collection vessel and leaving a solid residue in the crucible that substantially consists only of the one or more radionuclides, and
wherein the upper heating block comprises one or more upper heating elements configured to selectively generate heat having a second temperature sufficient to melt a condensate of the vapor collected in the collection vessel.

13. The sublimation apparatus of claim 12, further comprising one or more cooling passages formed through the upper heating block, the one or more cooling passages configured to selectively direct cooling fluid toward the collection vessel to facilitate condensation of the vapor.

14. The sublimation apparatus of claim 13, further comprising an air blower fluidly coupled to the one or more cooling passages and configured to direct the cooling fluid into the one or more cooling passages.

15. The sublimation apparatus of claim 13, further comprising one or more discharge passages formed between the upper heating block and the lower heating block, the one or more discharge passages fluidly coupled to the one or more cooling passages to exhaust the cooling fluid.

16. The sublimation apparatus of claim 12, wherein the crucible block further comprises a sealing element configured to seal the crucible from the ambient environment when the crucible block is in the closed position.

17. The sublimation apparatus of claim 16, further comprising a compensator assembly operatively coupled to the crucible block, the compensator assembly comprising one or more springs configured to apply a constant load on the sealing element.

18. The sublimation apparatus of claim 17, further comprising a plurality of compensator shafts coupled to the heating block and to the compensator assembly, wherein the crucible block is movable, relative to the heating block, between the open position and the closed position via the plurality of compensator shafts.

19. The sublimation apparatus of claim 12, further comprising a drive assembly operably coupled to the crucible block to move the crucible block between the open position and the closed position.

20. The sublimation apparatus of claim 12, wherein the second temperature is substantially equal to the first temperature.

21. A sublimation apparatus adapted to be disposed in a shielded environment and configured to be controlled remotely from outside the shielded environment, the sublimation apparatus comprising:
a crucible block adapted to retain a crucible containing a solid mixture comprising one or more radionuclides;
a lower heating block comprising one or more lower heating elements configured to selectively generate heat having a first temperature sufficient to at least partially sublime the solid mixture;
an upper heating block thermally insulated from the lower heating block;
a collection vessel coupled to the upper heating block, the upper heating block comprising one or more upper heating elements configured to selectively generate heat to heat the collection vessel; and
one or more cooling passages formed through the upper heating block,
wherein the crucible block is movable, relative to the lower heating block, between an open position, in which the crucible block is spaced from the lower heating block and the collection vessel, and a closed position, in which the crucible block is at least partially disposed within the lower heating block and the collection vessel is in fluid communication with the crucible,
wherein when the crucible block is in the closed position, the one or more lower heating elements are configured to heat the crucible block to the first temperature, thereby heating the solid mixture and producing a vapor that is collected by the collection vessel and leaving a solid residue in the crucible that substantially consists only of the one or more radionuclides, and
wherein the one or more cooling passages are configured to selectively direct cooling fluid toward the collection vessel to facilitate condensation of the vapor collected by the collection vessel.

22. A sublimation apparatus adapted to be disposed in a shielded environment and configured to be controlled remotely from outside the shielded environment, the sublimation apparatus comprising:
a crucible block adapted to retain a crucible;
a collection vessel comprising vapor condensate; and
a heating block coupled to the collection vessel and comprising one or more heating elements configured to selectively generate heat having a temperature sufficient to melt the vapor condensate in the collection vessel, wherein the crucible block is movable, relative to the heating block, between an open position, in which the crucible block is spaced from the heating block and the collection vessel, and a closed position, in which the collection vessel is in fluid communication with the crucible, wherein when the crucible block is in the closed position, the one or more heating elements are configured to heat the collection vessel to the temperature, thereby melting substantially all of the vapor condensate in the collection vessel, and wherein the crucible collects the melted vapor condensate.

* * * * *

UNITED STATES PATENT AND TRADEMARK OFFICE
CERTIFICATE OF CORRECTION

| | | |
|---|---|---|
| PATENT NO. | : 12,208,363 B2 | Page 1 of 1 |
| APPLICATION NO. | : 17/460150 | |
| DATED | : January 28, 2025 | |
| INVENTOR(S) | : David Rotsch et al. | |

It is certified that error appears in the above-identified patent and that said Letters Patent is hereby corrected as shown below:

In the Claims

Column 20, Line 54, Claim 5, "metal vapor." should be -- vapor. --.

Signed and Sealed this
Tenth Day of June, 2025

Coke Morgan Stewart
*Acting Director of the United States Patent and Trademark Office*